US010772087B2

(12) United States Patent
Yerramalli et al.

(10) Patent No.: US 10,772,087 B2
(45) Date of Patent: Sep. 8, 2020

(54) PHYSICAL LAYER SIGNALING TECHNIQUES IN WIRELESS COMMUNICATIONS SYSTEMS

(71) Applicant: QUALCOMM Incorporated, San Diego, CA (US)

(72) Inventors: Srinivas Yerramalli, San Diego, CA (US); Tao Luo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 83 days.

(21) Appl. No.: 15/347,382

(22) Filed: Nov. 9, 2016

(65) Prior Publication Data

US 2017/0142694 A1    May 18, 2017

Related U.S. Application Data

(60) Provisional application No. 62/255,394, filed on Nov. 14, 2015.

(51) Int. Cl.
*H04W 72/04* (2009.01)
*H04L 5/00* (2006.01)
(Continued)

(52) U.S. Cl.
CPC ......... *H04W 72/042* (2013.01); *H04L 1/1861* (2013.01); *H04L 5/0048* (2013.01);
(Continued)

(58) Field of Classification Search
CPC ... H04L 1/1861; H04L 5/0048; H04L 5/0053; H04W 72/042; H04W 16/14
See application file for complete search history.

(56) References Cited

U.S. PATENT DOCUMENTS 9,398,612 B2 * 7/2016 Bagheri .............. H04W 74/006
2008/0090583 A1 * 4/2008 Wang .................. H04W 72/121
455/452.1
(Continued)

FOREIGN PATENT DOCUMENTS

EP         3051862 A1    8/2016
WO    WO-2013070138 A1    5/2013
(Continued)

OTHER PUBLICATIONS

ISA/EP, International Search Report and Written Opinion of the International Searching Authority, Int'l Application No. PCT/US2016/061419, dated Feb. 8, 2017, European Patent Office, Rijswijk, NL, 14 pgs.

*Primary Examiner* — Edan Orgad
*Assistant Examiner* — Nourali Mansoury
(74) *Attorney, Agent, or Firm* — Dalei Dong; Holland & Hart LLP

(57) ABSTRACT

Techniques are provided that enable signaling of physical layer parameters in a shared radio frequency spectrum band or a dedicated radio frequency spectrum band (or any available radio frequency spectrum band). One or more physical layer channels may be used to transmit physical layer parameters, and different portions of the channel(s) may carry physical layer information for different groups of UEs. A base station may configure a UE into a UE group that monitors particular channel resources based on the UE group. In this manner, a base station may transmit physical layer parameters that may be received by a UE for receiving wireless communications for one or more subframe. A base station may transmit physical layer parameters to be monitored by the use using a physical hybrid automatic repeat request (HARQ) indicator channel (PHICH), a physical control format indicator channel (PCFICH), a physical
(Continued)

downlink control channel (PDCCH), or combinations thereof.

30 Claims, 14 Drawing Sheets

(51) Int. Cl.
*H04L 1/18* (2006.01)
*H04W 16/14* (2009.01)

(52) U.S. Cl.
CPC .......... *H04L 5/0053* (2013.01); *H04L 5/0091* (2013.01); *H04W 16/14* (2013.01); *H04W 72/044* (2013.01); *H04W 72/048* (2013.01)

(56) References Cited

U.S. PATENT DOCUMENTS

| | | | | |
|---|---|---|---|---|
| 2013/0322493 A1* | 12/2013 | Jersenius | .......... | H04W 72/0446 375/133 |
| 2014/0016534 A1* | 1/2014 | Kim | .................. | H04W 74/0833 370/312 |
| 2014/0036881 A1* | 2/2014 | Kim | ........................ | H04L 5/001 370/336 |
| 2015/0043444 A1* | 2/2015 | Wei | ....................... | H04B 7/0413 370/329 |
| 2015/0110037 A1* | 4/2015 | Wu | ........................ | H04L 5/0048 370/329 |
| 2015/0156006 A1 | 6/2015 | Takano et al. | | |
| 2015/0181583 A1* | 6/2015 | Siomina | ................ | H04W 16/14 370/330 |
| 2015/0349931 A1* | 12/2015 | Damnjanovic | ....... | H04L 5/0007 370/280 |
| 2016/0165591 A1* | 6/2016 | Li | ............................. | H04J 3/12 370/280 |
| 2016/0183222 A1* | 6/2016 | Suzuki | .............. | H04W 72/0446 370/280 |
| 2016/0261394 A1* | 9/2016 | Kazmi | .................. | H04L 5/0044 |
| 2016/0353507 A1* | 12/2016 | Uemura | ................. | H04W 76/15 |
| 2017/0127217 A1* | 5/2017 | Miao | ..................... | H04W 76/18 |

FOREIGN PATENT DOCUMENTS

| | | |
|---|---|---|
| WO | WO-2014177095 A1 | 11/2014 |
| WO | WO-2015013871 A1 | 2/2015 |

* cited by examiner

PHYSICAL LAYER SIGNALING TECHNIQUES IN WIRELESS COMMUNICATIONS SYSTEMS

CROSS REFERENCES

The present Application for Patent claims priority to U.S. Provisional Patent Application No. 62/255,394 by Yerramalli, et al., entitled "Physical Layer Signaling Techniques In Wireless Communications Systems," filed Nov. 14, 2015, assigned to the assignee hereof, and which is hereby incorporated by reference in its entirety.

BACKGROUND

Field of the Disclosure

The present disclosure, for example, relates to wireless communication systems, and more particularly to techniques for signaling physical layer parameters in a shared radio frequency spectrum band and a dedicated radio frequency spectrum band.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipment (UE) devices. A base station may communicate with UEs on downlink channels (e.g., for transmissions from a base station to a UE) and uplink channels (e.g., for transmissions from a UE to a base station).

Some modes of communication may enable communication between a base station and a UE in a shared radio frequency spectrum band, or in different radio frequency spectrum bands (e.g., in a dedicated radio frequency spectrum band and a shared radio frequency spectrum band) of a cellular network. However, in contrast to a carrier in a dedicated radio frequency spectrum band, which may be allocated for use by the devices of one public land mobile network (PLMN) and be available to a base station or a UE of the PLMN at predetermined (or all) times, a carrier in a shared radio frequency spectrum band may be available for use by the devices of the PLMN intermittently. This intermittent availability may be a result of contention for access to the carrier of the shared radio frequency spectrum band, between devices of the PLMN, devices of one or more other PLMNs, and/or other devices (e.g., Wi-Fi devices). For some radio frames, a device of a PLMN may win contention for access to a carrier in the shared radio frequency spectrum band, while for other radio frames, the device may not win contention for access to the carrier in the shared radio frequency spectrum band.

Because of the intermittent availability of carriers in a shared radio frequency spectrum band, base stations and UEs may use techniques that provide fairness in coexistence with other users of the shared radio frequency spectrum band, and that still provide reliable communications. For example, such techniques may include transmitting some information or types of radio frames using the dedicated radio frequency spectrum band and transmitting other information (e.g., lower priority information) or radio frames using the shared radio frequency spectrum band. Such techniques may be referred to as License-Assisted Access (LAA), and it may be desirable in some systems to periodically adjust some parameters associated with one or both of the dedicated radio frequency spectrum band or the shared radio frequency spectrum band, in order to enhance system efficiency.

SUMMARY

The present disclosure, for example, relates to wireless communication systems, and more particularly to techniques for signaling physical layer parameters in a shared radio frequency spectrum band and a dedicated radio frequency spectrum band. As previously indicated, in some cases it may be desirable to adjust one or more parameters for wireless transmissions between a user equipment (UE) and a base station. However, signaling mechanisms currently used by Long-Term Evolution (LTE) and LTE-Advanced (LTE-A) may not enable a UE to be informed of physical layer parameters that may vary periodically, such as on a subframe-by-subframe basis, for example.

The techniques described in the present disclosure enable signaling of physical layer parameters in a shared radio frequency spectrum band or a dedicated radio frequency spectrum band (or any available radio frequency spectrum band). In some examples, one or more physical layer channels may be reused to transmit physical layer parameters, and different portions of the channel(s) may carry physical layer information for different groups of UEs. A base station may configure a UE (e.g., based on UE capability or type of data being transmitted) into a UE group that monitors configured portions of the channel(s) based on the UE group. In this manner, a base station may transmit physical layer parameters that may be received by a UE for receiving wireless communications for one or more subframe. In some examples, the base station may configure a UE via radio resource control (RRC) signaling, and may transmit physical layer parameters to be monitored by the use using a physical hybrid automatic repeat request (HARQ) indicator channel (PHICH), a physical control format indicator channel (PCFICH), a physical downlink control channel (PDCCH), or combinations thereof.

In one example, a method for wireless communication is described. The method may include identifying a first subset of wireless resources of a channel for signaling first configuration information to a first user equipment (UE) group; identifying a second subset of wireless resources of the channel for signaling second configuration information to a second UE group, the first configuration information and the second configuration information including one or more parameters for wireless communications using a shared radio frequency spectrum band; and transmitting the first configuration information using the first subset of wireless resources and the second configuration information using the second subset of wireless resources.

In some examples of the method, the channel may include a physical hybrid automatic repeat request (HARQ) indicator channel (PHICH), a physical control format indicator channel (PCFICH), a physical downlink control channel (PDCCH), or combinations thereof. In some examples, the first configuration information may be signaled using the PHICH and the second configuration information may be signaled using one or more of the PCFICH or the PDCCH.

Additionally or alternatively, the method may also provide for configuring a UE to monitor one of the first subset of wireless resources or the second subset of wireless resources. The configuring the UE, in some examples, further may include transmitting radio resource control (RRC) information to the UE indicating which of the first subset of wireless resources or the second subset of wireless resources the UE is to monitor.

In some examples of the method, the first configuration information may include a set of frame format parameters and the second configuration information may include at least one overlapping parameter with the set of frame format parameters that has a different parameter value. The set of frame format parameters may include, for example, one or more of a multimedia broadcast single frequency network (MBSFN) subframe type parameter, a partial subframe information parameter, a downlink/uplink configuration parameter, a downlink transmission burst length parameter, a time duration for uplink transmissions parameter, a time duration for which a UE stops monitoring downlink transmissions parameter, a reference signal power variation parameter, an aperiodic channel state information-reference signal (CSI-RS) presence parameter or a discovery reference signal (DRS) presence indication and configuration, a system information presence parameter, or a do not monitor subframe parameter.

In some examples of the method, the first configuration information may include a first subset of a set of frame format parameters to be used by UEs of the first UE group, and the second configuration information may include a second subset of the set of frame format parameters to be used by UEs of the second UE group. A mapping of the first subset of the set of frame format parameters and the second subset of the set of frame format parameters may be provided to the first UE group and the second UE group via radio resource control (RRC) signaling, according to some examples.

In some examples of the method, block coding of the first configuration information and the second configuration information may be provided. In some examples, a first cyclic redundancy check (CRC) may be calculated for the first configuration information and a second CRC may be calculated for the second configuration information; and the first CRC may be appended to the first configuration information and the second CRC may be appended to the second configuration information. The transmitting further may include, in some examples, scrambling the first CRC with a first radio network temporary identifier (RNTI) that is assigned to the first UE group and scrambling the second CRC with a second RNTI that is assigned to the second UE group.

In some examples of the method, the first configuration information may include information for a current subframe and at least one subsequent subframe. Additionally or alternatively, the first configuration information further may include a header that indicates a size of the first configuration information. Additionally or alternatively, the first configuration information further may include power variation information to indicate a power variation between two or more subframes.

In one example, a method for wireless communication is described. The method may include receiving configuration information identifying a subset of a set of wireless resources of a channel that contain frame format information for one or more subframes, the frame format information comprising one or more parameters for wireless communications using a shared radio frequency spectrum band; monitoring the subset of the set of wireless resources; and receiving the frame format information on the subset of the set of wireless resources.

In some examples of the method, the channel may include a physical hybrid automatic repeat request (HARQ) indicator channel (PHICH), a physical control format indicator channel (PCFICH), a physical downlink control channel (PDCCH), or combinations thereof. In some examples, a first portion of the frame format information may be received on the PHICH and a second portion of the frame format information may be received on the PCFICH or the PDCCH.

In some examples of the method, the configuration information may be received via radio resource control (RRC) signaling from a base station. In some examples, the frame format information may include one or more of a multimedia broadcast single frequency network (MBSFN) subframe type parameter, a partial subframe information parameter, a downlink/uplink configuration parameter, a downlink transmission burst length parameter, a time duration for uplink transmissions parameter, a time duration for which a UE stops monitoring downlink transmissions parameter, a reference signal power variation parameter, an aperiodic channel state information-reference signal (CSI-RS) presence parameter or a discovery reference signal (DRS) presence indication and configuration, a system information presence parameter, or a do not monitor subframe parameter.

In one example, an apparatus for wireless communication is described. The apparatus may include a processor; and memory in electronic communication with the processor. The processor and the memory may be configured to identify a first subset of wireless resources of a channel for signaling first configuration information to a first user equipment (UE) group; identify a second subset of wireless resources of the channel for signaling second configuration information to a second UE group, the first configuration information and the second configuration information including one or more parameters for wireless communications using a shared radio frequency spectrum band; and transmit the first configuration information using the first subset of wireless resources and the second configuration information using the second subset of wireless resources.

In some examples of the apparatus, the channel may include a physical hybrid automatic repeat request (HARQ) indicator channel (PHICH), a physical control format indicator channel (PCFICH), a physical downlink control channel (PDCCH), or combinations thereof. In some examples, the first configuration information may be signaled using the PHICH and the second configuration information may be signaled using one or more of the PCFICH or the PDCCH.

Additionally or alternatively, the apparatus may also provide for configuring a UE to monitor one of the first subset of wireless resources or the second subset of wireless resources. The configuring the UE, in some examples, further may include transmitting radio resource control (RRC) information to the UE indicating which of the first subset of wireless resources or the second subset of wireless resources the UE is to monitor.

In some examples of the apparatus, the first configuration information may include a set of frame format parameters and the second configuration information may include at least one overlapping parameter with the set of frame format parameters that has a different parameter value.

In one example, an apparatus for wireless communication is described. The apparatus may include a processor; and memory in electronic communication with the processor. The processor and memory configured to receive configuration information identifying a subset of a set of wireless resources of a channel that contain frame format information for one or more subframes, the frame format information comprising one or more parameters for wireless communications using a shared radio frequency spectrum band; monitor the subset of the set of wireless resources; and receive the frame format information on the subset of the set of wireless resources.

In some examples of the apparatus, the channel may include a physical hybrid automatic repeat request (HARQ) indicator channel (PHICH), a physical control format indicator channel (PCFICH), a physical downlink control channel (PDCCH), or combinations thereof. In some examples, a first portion of the frame format information may be received on the PHICH and a second portion of the frame format information may be received on the PCFICH or the PDCCH. In some examples of the apparatus, the configuration information may be received via radio resource control (RRC) signaling from a base station.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
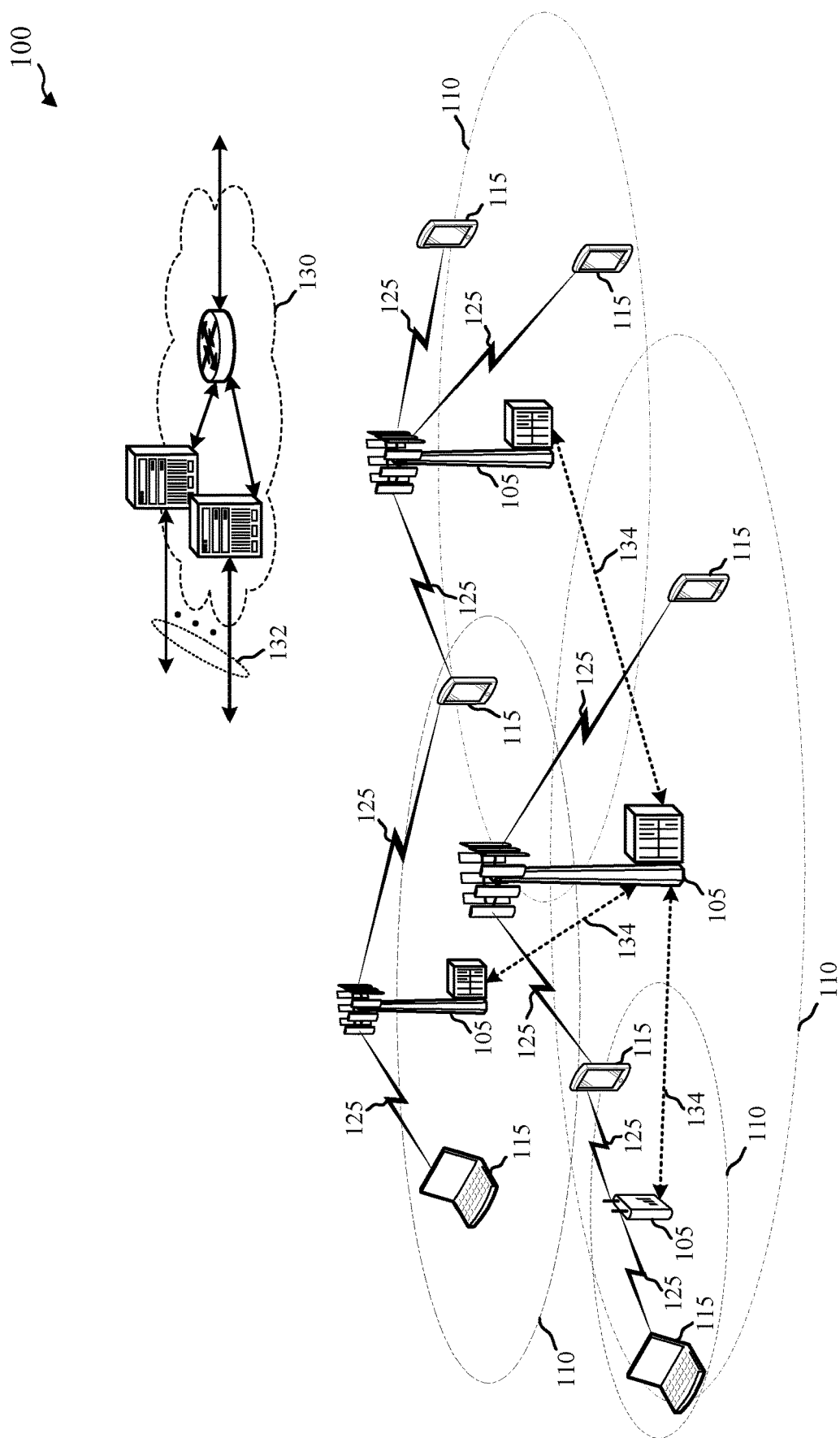
FIG. 1 illustrates an example of a wireless communication system, in accordance with various aspects of the present disclosure.

Techniques are described in which a shared radio frequency spectrum band is used for at least a portion of communications over a wireless communication system. In some examples, the shared radio frequency spectrum band may be used for LTE/LTE-A communications. The shared radio frequency spectrum band may be used in combination with, or independent from, a dedicated radio frequency spectrum band. The dedicated radio frequency spectrum band may include a radio frequency spectrum band for which transmitting apparatuses may not contend for access (e.g., a radio frequency spectrum band licensed to particular users for particular uses, such as a licensed radio frequency spectrum band usable for LTE/LTE-A communications). The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner).

With increasing data traffic in cellular networks that use a dedicated radio frequency spectrum band, offloading of at least some data traffic to a shared radio frequency spectrum band may provide a cellular operator (e.g., an operator of a PLMN or a coordinated set of base stations defining a cellular network, such as an LTE/LTE-A network) with opportunities for enhanced data transmission capacity. Use of a shared radio frequency spectrum band may also provide service in areas where access to a dedicated radio frequency spectrum band is unavailable.

Because a device may use both, a dedicated radio frequency spectrum band and a shared radio frequency spectrum band, base stations and UEs described in aspects of the disclosure may use techniques to provide enhanced coexistence with other users of the shared radio frequency spectrum band, enhanced system operation, and reduced UE power consumption. The present disclosure provides techniques for signaling physical layer parameters in a shared radio frequency spectrum band and a dedicated radio frequency spectrum band. As previously indicated, in some cases it may be desirable to adjust one or more parameters for wireless transmissions between a user equipment (UE) and a base station. However, signaling mechanisms currently used by Long-Term Evolution (LTE) and LTE-Advanced (LTE-A) may not enable a UE to be informed of physical layer parameters that may vary on a subframe-by-subframe basis, for example.

The techniques described in the present disclosure enable signaling of physical layer parameters in a shared radio frequency spectrum band or a dedicated radio frequency spectrum band (or any available radio frequency spectrum band). In some examples, one or more physical layer channels may be used to transmit physical layer parameters, and different portions of the channel(s) may carry physical layer information for different groups of UEs. A base station may configure a UE (e.g., based on UE capability or type of data being transmitted) into a UE group that monitors configured portions of the channel(s) based on the UE group. In this manner, a base station may transmit physical layer parameters that may be received by a UE for receiving wireless communications for one or more subframe. In some examples, the base station may configure a UE via radio resource control (RRC) signaling, and may transmit physical layer parameters to be monitored by the use using a physical hybrid automatic repeat request (HARQ) indicator channel (PHICH), a physical control format indicator channel (PCFICH), a physical downlink control channel (PDCCH), or combinations thereof.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communication system 100, in accordance with various aspects of the present disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term evolved Node B (eNB) may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, shared, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A RLC layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the RRC protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels. According to various aspects of the present disclosure, a base station 105 may signal information related to PHY layer parameters to one or more UEs 115. Such PHY layer parameters may include, for example, varying transmission power for some transmissions on a shared radio frequency spectrum band or dedicated radio frequency spectrum band, transmitting partial subframes using the radio frequency spectrum band, modifying uplink/downlink configurations, and modifying a time duration that a UE 115 may not monitor for downlink transmissions. In some examples, the PHY layer parameters may be signaled in a physical layer channel that a UE 115 may monitor to determine PHY layer characteristics.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink (DL) transmissions, from a base station 105 to a UE 115, or uplink (UL) transmissions, from a UE 115 to a base station 105. The downlink transmissions may also be called forward link transmissions, while the uplink transmissions may also be called reverse link transmissions.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. (collectively referred to as "data" in some cases in this disclosure). The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or dual-connectivity operation. A carrier may also be referred to as a component carrier (CC), a layer, a channel, etc. The terms "carrier," "component carrier," "cell," and "channel" may be used interchangeably herein. Carrier aggregation may be used with both FDD and TDD component carriers.

In an LTE/LTE-A network, a UE 115 may be configured to communicate using up to five component carriers (CCs) when operating in a carrier aggregation mode or dual-connectivity mode. One or more of the CCs may be configured as a DL CC, and one or more of the CCs may be configured as a UL CC. Also, one of the CCs allocated to a UE 115 may be configured as a primary CC (PCC), and the remaining CCs allocated to the UE 115 may be configured as secondary CCs (SCCs).

In some examples, the wireless communication system 100 may support operation over a dedicated radio frequency spectrum band (e.g., a radio frequency spectrum band for which transmitting apparatuses may not contend for access because the radio frequency spectrum band is licensed to particular users for particular uses (e.g., a licensed radio frequency spectrum band usable for LTE/LTE-A communications)) or a shared radio frequency spectrum band (e.g., a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner)). Upon winning a contention for access to the shared radio frequency spectrum band, a transmitting apparatus (e.g., a base station 105 or UE 115) may transmit one or more channel usage beacon signal (CUBS) over the shared radio frequency spectrum band. The CUBS may reserve the shared radio frequency spectrum band by providing a detectable energy on the shared radio frequency spectrum band. The CUBS may also serve to identify the transmitting apparatus or serve to synchronize the transmitting apparatus and a receiving apparatus.

As previously indicated, it may be desirable, in some situations, to adjust one or more parameters for wireless transmissions between a UE 115 and a base station 105. Various techniques described herein enable signaling of physical layer parameters in a shared radio frequency spectrum band or a dedicated radio frequency spectrum band (or any available radio frequency spectrum band). In some examples, one or more physical layer channels may be reused to transmit physical layer parameters, and different portions of the channel(s) may carry physical layer information for different groups of UEs 115. A base station 105 may configure a UE 115 (e.g., based on UE capability or type of data being transmitted) into a UE group that monitors configured portions of the channel(s) based on the UE group. In this manner, a base station 105 may transmit physical layer parameters that may be received by a UE 115 for receiving wireless communications for one or more subframe. In some examples, the base station 105 may configure a UE 115 via RRC signaling, and may transmit physical layer parameters to be monitored by the use using a physical hybrid automatic repeat request (HARQ) indicator channel (PHICH), a physical control format indicator channel (PCFICH), a physical downlink control channel (PDCCH), or combinations thereof.

Figure 2:
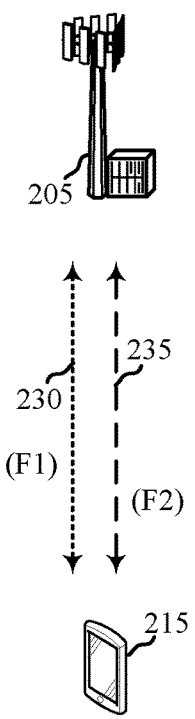
FIG. 2 shows a wireless communication system in which LTE/LTE-A may be deployed under a licensed-assisted access (LAA) carrier aggregation (CA) mode using a shared radio frequency spectrum band, in accordance with various aspects of the present disclosure.

FIG. 2 shows a wireless communication system 200 in which LTE/LTE-A may be deployed under a licensed-assisted access (LAA) carrier aggregation (CA) mode using a shared radio frequency spectrum band, in accordance with various aspects of the present disclosure. The wireless communication system 200 may be an example of portions of the wireless communication system 100 described with reference to FIG. 1. Moreover, a base station 205 may be an example of aspects of one or more of the base stations 105 described with reference to FIG. 1, while a UE 215 may be examples of aspects of one or more of the UEs 115 described with reference to FIG. 1.

In one example of a LAA CA mode in the wireless communication system 200, the base station 205 may transmit OFDMA waveforms to the UE 215 using a first bidirectional link 230 and may receive OFDMA waveforms, single-carrier frequency-division multiple access (SC-FDMA) waveforms, or resource block interleaved FDMA waveforms from the UE 215 using the first bidirectional link 230. The first bidirectional link 230 may be associated with a frequency F1 in the shared radio frequency spectrum band. The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner). The base station 205 may also transmit OFDMA waveforms to the UE 215 using a second bidirectional link 235 and may receive SC-FDMA waveforms from the UE 215 using the second bidirectional link 235. The second bidirectional link 235 may be associated with a frequency F2 in a dedicated radio frequency spectrum band. The dedicated radio frequency spectrum band may include a radio frequency spectrum band for which transmitting apparatuses may not contend for access (e.g., a radio frequency spectrum band licensed to particular users for particular uses, such as a licensed radio frequency spectrum band usable for LTE/LTE-A communications). The first bidirectional link 230 may provide a downlink and uplink capacity offload for the base station 205. This example may occur when a service provider (e.g., a mobile network operator (MNO)) uses a dedicated radio frequency spectrum band and relieves traffic or signaling congestion using a shared radio frequency spectrum band. This example is presented for illustrative purposes and there may be other similar modes of operation or deployment scenarios that combine LTE/LTE-A communication in a dedicated radio frequency spectrum band with LTE/LTE-A communication in a shared radio frequency spectrum band for capacity offload.

As described above, one type of service provider that may benefit from the capacity offload offered by using LTE/LTE-A in a shared radio frequency spectrum band is a traditional MNO having access rights to an LTE/LTE-A dedicated radio frequency spectrum band. For these service providers, an operational example may include a boot-strapped mode that uses a LTE/LTE-A PCC on the dedicated radio frequency spectrum band and at least one SCC on the shared radio frequency spectrum band.

In the LAA CA mode, data and control signals may, for example, be communicated in the dedicated radio frequency spectrum band (e.g., via the second bidirectional link 235) while data may, for example, be communicated in the shared radio frequency spectrum band (e.g., via the first bidirectional link 230). Alternatively, control signals may also be communicated in the shared radio frequency spectrum band. In some examples, the carrier aggregation mechanisms supported when using a shared radio frequency spectrum band may fall under a hybrid frequency division duplexing-time division duplexing (FDD-TDD) carrier aggregation or a hybrid time division duplexing-time division duplexing (TDD-TDD) carrier aggregation with different symmetry across component carriers.

In some examples, a transmitting apparatus such as one of the base stations 105 described with reference to FIG. 1 or base station 205 described with reference to FIG. 2, or one of the UEs 115 described with reference to FIG. 1 or the UE 215 described with reference to FIG. 2, may use a gating interval to gain access to a channel of a shared radio frequency spectrum band (e.g., to a physical channel of the shared radio frequency spectrum band). In some examples, the gating interval may be periodic. For example, the periodic gating interval may be synchronized with at least one boundary of an LTE/LTE-A radio interval. The gating interval may define the application of a contention-based protocol, such as a listen before talk (LBT) protocol based on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a CCA procedure. The outcome of the CCA procedure may indicate to the transmitting apparatus whether a channel of a shared radio frequency spectrum band is available or in use for the gating interval (also referred to as an LBT radio frame). When a CCA procedure indicates that the channel is available for a corresponding LBT radio frame (e.g., "clear" for use), the transmitting apparatus may reserve or use the channel of the shared radio frequency spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame.

In some examples that employ a LAA CA mode, various techniques may be used to provide fair coexistence with other users of the shared radio frequency spectrum band, provide enhanced system operation and provide reduced UE power consumption. Some of such techniques may rely on signaling of several physical layer parameters, that a UE 115 may receive and use for downlink transmissions, uplink transmissions, of combinations thereof. In some examples, physical layer parameters may include a multimedia broadcast single frequency network (MBSFN) subframe type parameter, a partial subframe information parameter (e.g., two-to-four bits), a downlink/uplink configuration parameter (e.g., four to six bits), a downlink transmission burst length parameter, a time duration for uplink transmissions parameter, a time duration for which a UE stops monitoring downlink transmission parameters, a reference signal power variation parameter, an aperiodic channel state information-reference signal (CSI-RS) presence parameter or a discovery reference signal (DRS) presence indication and configuration, a system information presence parameter, a do not monitor subframe parameter, or combinations thereof. Furthermore, in some aspects of the disclosure, these parameters may be signaled on a subframe-by-subframe basis thus providing a dynamic or semi-static configurations of physical layer parameters.

In some aspects of the disclosure, such physical layer parameters may be signaled using resources of one or more physical layer channels, such as the PCFICH, the PHICH, the PDCCH, or combinations thereof. In some examples, the physical layer parameters are signaled using the PHICH, which is not used in LAA CA mode, and multiple groups of UEs 215 may be signaled using a group common PHICH design. In other examples, such physical layer parameters may be signaled in the PCFICH. However, the PCFICH may have relatively limited capacity, and thus in some examples the PCFICH channel may be used when limited amounts of physical layer parameters need to be provided to a UE group. In some examples, a first portion of the physical layer parameters may be transmitted using the PCFICH with a second portion of the physical layer parameters transmitted using the PHICH, the PDCCH, or combinations thereof. The PCFICH may be desirable for some parameters because it provides for relatively fast decoding.

In some examples, PHICH resources are used to signal physical layer parameters, which may include signaling of parameters for two or more different UE groups. For example, different UEs may belong to different UE groups based on physical layer parameters associated with the different UEs. In such cases, a first group of UEs may monitor a first subset of PHICH resources, and a second group of UEs may monitor a second subset of PHICH resources. PHICH resources may have a configurable number of available resources that base station 205 may configure according to the amount of physical layer parameters that are to be provided to different UE groups using group common PHICH resources. Furthermore, PHICH resources may be decoded by a UE 215 relatively quickly following cell-specific reference signal (CRS) channel estimation, which can help reduce any impact to UE 215 timeline for receiving and decoding downlink transmissions.

In other examples, PDCCH resources may be used to signal physical layer parameters, which may include signaling of parameters for two or more different UE groups, with a first group of UEs monitoring a first subset of common PDCCH resources, and a second group of UEs monitoring a second subset of common PDCCH resources. PDCCH resources may provide a relatively high capacity, and provide a more reliable transmission than PHICH signaling due to presence of CRC, although in some examples a CRC may be used for group common PHICH transmissions, as will be discussed in more detail below. PDCCH based signaling of physical layer parameters may, however, incur additional decoding delay that may impact UE 215 timelines for receiving and decoding downlink transmissions. Additionally, a Scell may not be expected to monitor common PDCCH in some deployments, so such monitoring may be implemented as a new behavior in such cases.

In some examples, a UE 215 may perform neighbor cell discovery measurements according to a discovery measurement timing configuration (DMTC). Such cell discovery measurements may include measurements associated with a DRS transmitted by a neighbor cell (e.g., a neighboring base station to base station 205). The DMTC may indicate the time instances when the UE 215 may assume DRS to be present for a carrier. A DMTC occasion has a fixed duration of 6 ms and a configurable periodicity of 40, 80, or 160 ms, according to some deployments. The transmission times of DRS occasions of different cells on a given carrier frequency may be aligned with the DMTC configuration in order to ensure that different cells may be discovered by a UE 215 during a DRS transmission. In order to enable neighbor cell measurements with a such a "floating" DRS, scrambling sequences of subframes used by a UE 215 to decode a subframe, and the associated subframe number that is transmitted may be aligned. However, in instances where LBT procedures of a shared radio frequency spectrum band may result in changed alignments of transmissions, a subframe number of an associated scrambling sequence of the subframe may be mismatched.

According to some examples of the present disclosure, scrambling sequences used for a DMTC occasion may be set to be a first scrambling sequence for a first subset of subframes that may be transmitted in a frame (e.g., a subframe 0 scrambling sequence may be used for subframes 0 through 5 of a frame), and may be set to be a second scrambling sequence for a second subset of subframes (e.g., a subframe 5 scrambling sequence may be used for subframes 5 through 9 of a frame). Such scrambling sequences may be used for subframes that are part of the DMTC window, and may be used for all reference signals (PSS/SSS/CRS/CSI-RS/UE-RS etc.) and channels including PCFICH, PDCCH, PDSCH, EPDCCH, PHICH etc., during the DMTC window. The start positions for PCFICH/PDCCH/PHICH in all the subframes in the DMTC window may be determined by assuming that the scrambling is either the first scrambling sequence (e.g., subframe 0 scrambling) or the second scrambling sequence (e.g., subframe 5 scrambling). Similarly, the PDSCH processing and sequence scrambling may also use only either SF0 or SF5 scrambling. This may enable a floating DRS to be multiplexed with PDSCH in all subframes. In some examples, a PSS and SSS transmitted in subframes within the DMTC window, and a DRS may be rate-matched around the tones containing the PSS/SSS signals, or the DRS may be rate-matched around the center six resource blocks of the subframes to avoid tones that may include PSS/SSS. Additionally, in some examples, in TDD deployments for an uplink transmission following a DMTC, the uplink scrambling sequence may be selected to be a same scrambling sequence as the downlink subframe scrambling sequence.

Figure 3A:
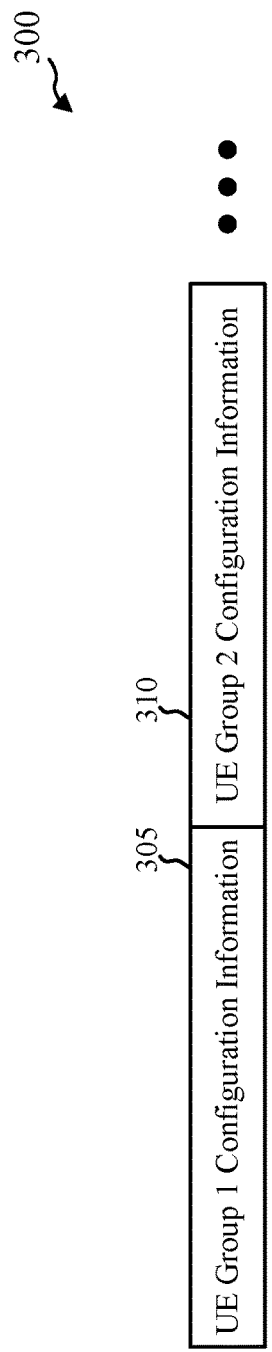
FIG. 3A shows an example of resources of a physical channel for transmission of configuration parameters for LAA transmissions, in accordance with various aspects of the present disclosure.

FIG. 3A shows an example of resources of a physical channel for transmission of configuration parameters 300 for LAA transmissions, in accordance with various aspects of the present disclosure. The configuration parameters 300 may be transmitted by a device such as one of the base stations 105 described with reference to FIG. 1 or base stations 205 described with reference to FIG. 2.

The configuration parameters 300 may be transmitted using a physical channel (e.g., PHICH, PCFICH, or PDCCH), similarly as discussed above, on either a shared radio frequency spectrum band or a dedicated radio frequency spectrum band. In the example of FIG. 3A, the configuration parameters 300 may include UE group one configuration information 305, and UE group two configuration information 310. In some examples, additional configuration information may be provided for additional UE groups, and the discussion provided with respect to UE group one configuration information 305 and UE group two configuration information 310 may be extended to such additional groups. In some examples, a number of UEs (e.g., UEs 115 of FIG. 1 or UEs 215 of FIG. 2) in a cell may be divided to monitor different group information transmitted in the configuration parameters 300. For example, if configuration parameters are transmitted using a group common PHICH, different UEs may monitor different portions of the PHICH to determine their configuration parameters. A serving base station (e.g., a base station 105 of FIG. 1 or a base station 205 of FIG. 2) may configure each UE to monitor one or more set of resources, such as through RRC signaling. Different UEs may be configured in a UE group, with each UEs in each UE group monitoring configured PHICH resources to determine their physical layer parameters.

In some examples, UE group one configuration information 305 and UE group two configuration information 310 may be transmitted on a subframe-by-subframe basis and be used to signal the different UEs with different sets of parameters, such as different parameters related to LAA CA mode operation. For example, some UEs may support reception and transmission of partial subframes, and such UEs may be configured to monitor UE group one configuration information 305, and thus may be signaled a first set of configuration parameters that are contained in UE group one configuration information 305. Other UEs, however, may not support reception and transmission of partial subframes, and such UEs may be configured to monitor UE group two configuration information 310, and thus may be signaled a second set of configuration parameters that are contained in UE group two configuration information 310. In other examples, different lengths of downlink transmission bursts can be indicated to UEs in different UE groups through UE group one configuration information 305 and UE group two configuration information 310. Additionally or alternatively, after a downlink transmission burst, UEs of different UE groups may be indicated different amounts of time for uplink transmission so that different UEs can wake up at different times, and thus provide power savings for different UEs based on the particular transmissions. In still further examples, a given subframe may be a valid discovery reference signal (DRS) subframe for some UEs but not for other UEs, which may be signaled to UE groups through UE group one configuration information 305 and UE group two configuration information 310.

In some examples, the UE group one configuration information 305 and the UE group two configuration information 310 may include frame format parameters that are subsets of a set of frame format parameters. For example, the set of frame format parameters may include one or more of a multimedia broadcast single frequency network (MBSFN) subframe type parameter, a partial subframe information parameter, a downlink/uplink configuration parameter, a downlink transmission burst length parameter, a time duration for uplink transmissions parameter, a time duration for which a UE stops monitoring downlink transmissions parameter, a reference signal power variation parameter, an aperiodic CSI-RS presence parameter or a discovery reference signal (DRS) presence indication and configuration, a system information presence parameter, or a do not monitor subframe parameter. For some parameters, a UE may need to take some action, and UEs of different UE groups may be signaled to take different actions. For example, for a parameter indicating a UE to not monitor downlink transmissions for a time duration (e.g., for the next few milliseconds), the UE may suspend all downlink processing, including demodulation, channel quality indication (CQI) and radio resource management (RRM) processing, and the like.

In some examples, the UE group one configuration information 305 and the UE group two configuration information 310 may include some bits that may be used to carry information about a subsequent subframe, in addition to indicating configuration in current subframe. Such information may provide advance signaling to a UE to help it prepare for processing. For example, information may be provided for advance notification of a partial subframe configuration and physical channel resources associated with the partial subframe configuration.

In some examples, a portion of the UE group one configuration information 305 and the UE group two configuration information 310 may be signaled using a first physical layer channel (e.g., the PHICH) and other portions of the UE group one configuration information 305 and the UE group two configuration information 310 may be signaled using a second physical layer channel (e.g., one or more of the PCFICH or the PDCCH).

In further examples, the UE group one configuration information 305 and the UE group two configuration information 310 may signal power variation within a transmission burst. For example, some transmissions may use some power backoff in a subframe when transmitting 256QAM (or higher order modulation in general), and a few of the bits in the UE group one configuration information 305 and/or the UE group two configuration information 310 may indicate the power variation from one subframe to another.

Figure 3B:
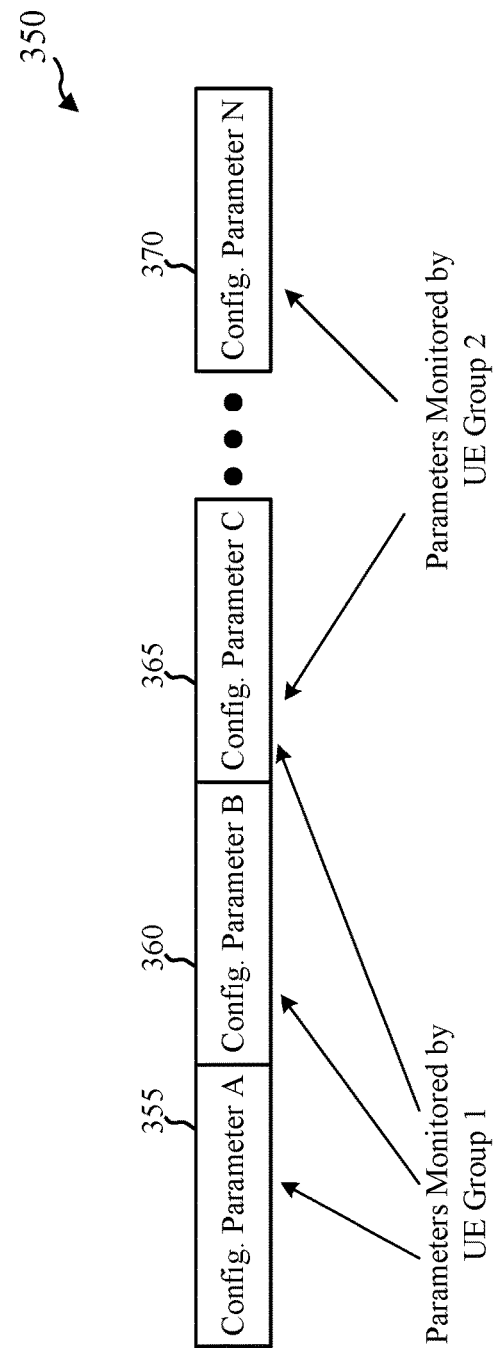
FIG. 3B shows another example of resources of a physical channel for transmission of configuration parameters for LAA transmissions, in accordance with various aspects of the present disclosure.

FIG. 3B shows another example of resources of a physical channel for transmission of configuration parameters 350 for LAA transmissions, in accordance with various aspects of the present disclosure. The configuration parameters 350 may be transmitted by a device such as one of the base stations 105 described with reference to FIG. 1 or base stations 205 described with reference to FIG. 2.

The configuration parameters 350 may be transmitted using a physical channel (e.g., PHICH, PCFICH, or PDCCH), similarly as discussed above, on either a shared radio frequency spectrum band or a dedicated radio frequency spectrum band. In the example of FIG. 3B, the configuration parameters 300 may include configuration parameter A 355, configuration parameter B 360, configuration parameter C 365, through configuration parameter N 370. Thus, the various configuration parameters 355 through 370 may be divided into different portions of physical channel (e.g., PHICH, PDCCH, or PCFICH) resources. Different UEs (e.g., UEs 115 of FIG. 1 or UEs 215 of FIG. 2) may be configured (e.g., via RRC signaling from a base station such as a base station 105 of FIG. 1 or a base station 205 of FIG. 2) to monitor a subset of the configuration parameters 355 through 370 to determine their physical layer parameters. For example, as illustrated in FIG. 3B, UEs in a first group, UE group 1, may monitor configuration parameter A 355, configuration parameter B 360, and configuration parameter C 365, while UEs of UE group 2 may monitor configuration parameter C 365 and configuration parameter N 370. The different configuration parameters may correspond to various configuration parameters such as discussed above with respect to FIG. 3A. The number of configuration parameters and mapping from configuration parameter to resources of the physical layer channel (e.g., PHICH, PDCCH, or PCFICH) may be indicated by RRC configuration.

Figure 4:
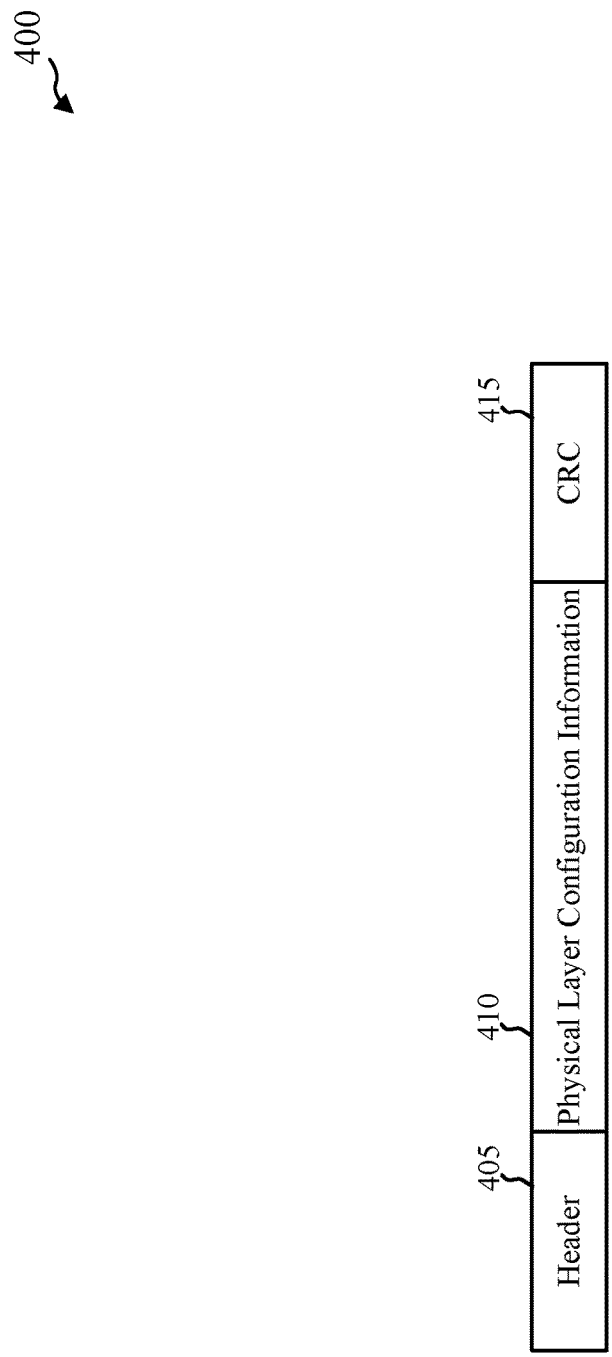
FIG. 4 shows information transmitted, including a header and a cyclic redundancy check (CRC), using a physical channel transmission of configuration information, in accordance with various aspects of the present disclosure.

FIG. 4 shows information transmitted, including a header and a cyclic redundancy check (CRC), using a physical channel transmission of configuration information 400, in accordance with various aspects of the present disclosure. The configuration information 400 may be transmitted by a device such as one of the base stations 105 described with reference to FIG. 1 or base stations 205 described with reference to FIG. 2.

In the example, of FIG. 4, configuration information 400 may include a header 405, physical layer configuration information 410, and a CRC 415. In some examples, configuration information may include only physical layer configuration information 410, which may include information described in FIG. 3A or FIG. 3B, for example. In some examples, block coding of the bits included in the physical layer configuration information 410 may be used to improve reliability. For example, Reed Muller codes may be used to block code bits of the physical layer configuration information 410. In the example of FIG. 4, the configuration information 400 includes optional CRC 415. In some examples, a base station (e.g., a base station 105 of FIG. 1 or a base station 205 of FIG. 2) may compute a CRC, such as a four-bit CRC, which may significantly improve the reliability of reception of the configuration information 400 at a UE (e.g., a UE 115 of FIG. 1 or a UE 215 of FIG. 2). In some examples, the CRC 415 may be scrambled with a group common radio network temporary identifier (RNTI). In such examples, each UE may be assigned (e.g., via RRC signaling) a physical channel (e.g., a PHICH) resource RNTI to monitor.

In the example of FIG. 4, the configuration information 400 also includes optional header 405. In some examples, a header 405 may be provided to indicate a size of the payload transmitted in the physical layer configuration information 410. In some examples, the header 405 may be a two-bit header to indicate the size of the payload, and UEs may be configured with corresponding payload sizes based on the state of the two-bit header. In some examples, the header 405 is not block coded or protected by CRC.

Figure 5:
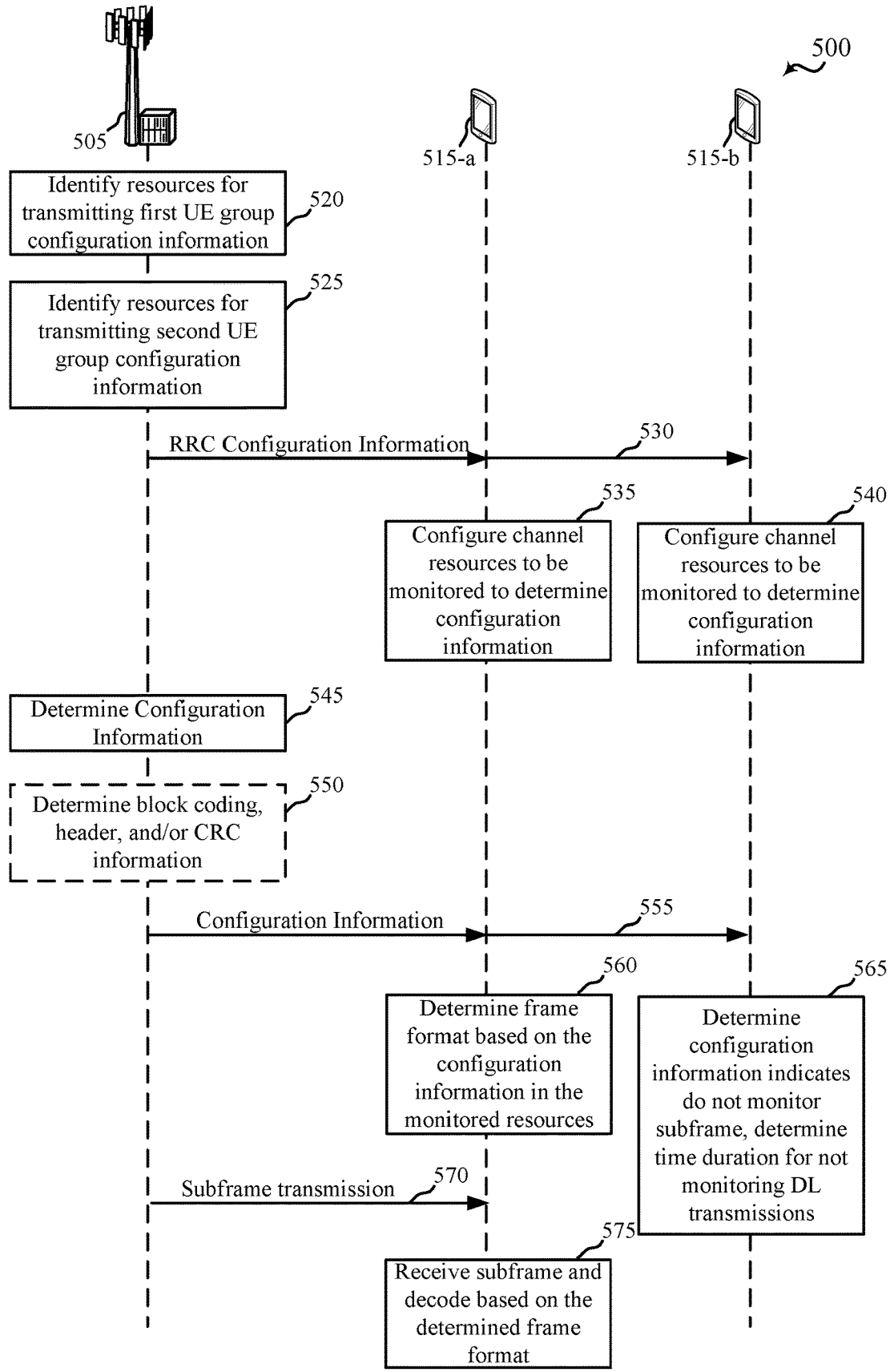
FIG. 5 shows a message flow in which a base station may transmit configuration information for physical layer resources to a first UE and a second UE, in accordance with various aspects of the present disclosure.

FIG. 5 shows a message flow in which a base station 505 may transmit configuration information for physical layer resources to a first UE 515-a and a second UE 515-b, in accordance with various aspects of the present disclosure. The messages may be transmitted between base station 505, first UE 515-a and second UE 515-b using physical layer resources such as discussed above. The base station 505 may be an example of aspects of the base station 105 described with reference to FIG. 1 or base station 205 described with reference to FIG. 2, and the first UE 515-a and second UE 515-b may be examples of aspects of the UEs 115 described with reference to FIG. 1 or the UE 215 described with reference to FIG. 2.

At 520, the base station 505 may identify resources for transmitting first UE group configuration information. Such resources may be a portion of physical channel resources, such as resources of a PHICH, PCFICH, or PDCCH, similarly as discussed above. At block 525, the base station 505 may identify resources for transmitting second UE group configuration information. Such resources also may be a portion of physical channel resources, such as resources of a PHICH, PCFICH, or PDCCH, similarly as discussed above. The first UE group configuration information and the second UE group configuration information may include one or more parameters for wireless communications using a shared radio frequency spectrum band. For example, such parameters may be associated with LAA CA mode transmissions, and may include physical parameters associated with one or more subframes in a manner similarly as discussed above. The base station 505 may transmit RRC configuration information 530 to first UE 515-a and second UE 515-b, which may include resources that are to be monitored by each of the first UE 515-a and second UE 515-b.

The first UE 515-a, at block 535, may configure channel resources to be monitored to determine configuration information according to the RRC configuration information 530. Likewise, the second UE 515-b, at block 540, may configure channel resources to be monitored to determine configuration information according to the RRC configuration information 530. At block 545, the base station 505 may determine configuration information for a transmission. Such configuration information may include one or more physical parameters for a subframe or for UE operation, such as, for example, one or more of a MBSFN subframe type parameter, a partial subframe information parameter, a downlink/uplink configuration parameter, a downlink transmission burst length parameter, a time duration for uplink transmissions parameter, a time duration for which a UE stops monitoring downlink transmissions parameter, a reference signal power variation parameter, an aperiodic CSI-RS presence parameter or a DRS presence indication and configuration, a system information presence parameter, or a do not monitor subframe parameter.

At optional block 550, the base station 505 may determine whether to apply block coding to the configuration information, and may determine header, and/or CRC information for the configuration information. The base station 505 may transmit the configuration information 555 to the first UE 515-a and second UE 515-b. The configuration information 555 for the different UEs may be included in different resources of the physical channel used for transmission, according to the identified resources for transmitting different UE group configuration information from block 520 and block 525. In the example of FIG. 5, the base station 505 may determine that the first UE 515-a (and any other UEs in the first UE group) is to receive the subframe and may include configuration information for such reception, and the base station 505 may determine that the second UE 515-b (and any other UEs in the second UE group) is to not monitor the subframe or other downlink transmissions for a time duration.

At block 560, the first UE 515-a may determine a frame format based on the configuration information in the monitored resources. At block 565, the second UE 515-b may determine that the configuration information indicates do not monitor subframe, and may determine the time duration for not monitoring DL transmissions. The second UE 515-b may thus go into a power saving mode not monitoring downlink transmissions for the time duration. The base station 505 may transmit subframe transmission 570, which may be received by the first UE 515-a. At block 575, the first UE 515-a may receive the subframe transmission 570 and decode the subframe based on the determined frame format from block 560. While the example of FIG. 5 illustrates only two UEs 515, it will be understood that techniques described may be applied to more UEs, and may be applied to more UE groups. Furthermore, while the example of FIG. 5 illustrates second UE 515-b not monitoring subframe transmission 570, other examples may provide configuration information that the second UE 515-b may use to receive subframe transmission 570.

Figure 6:
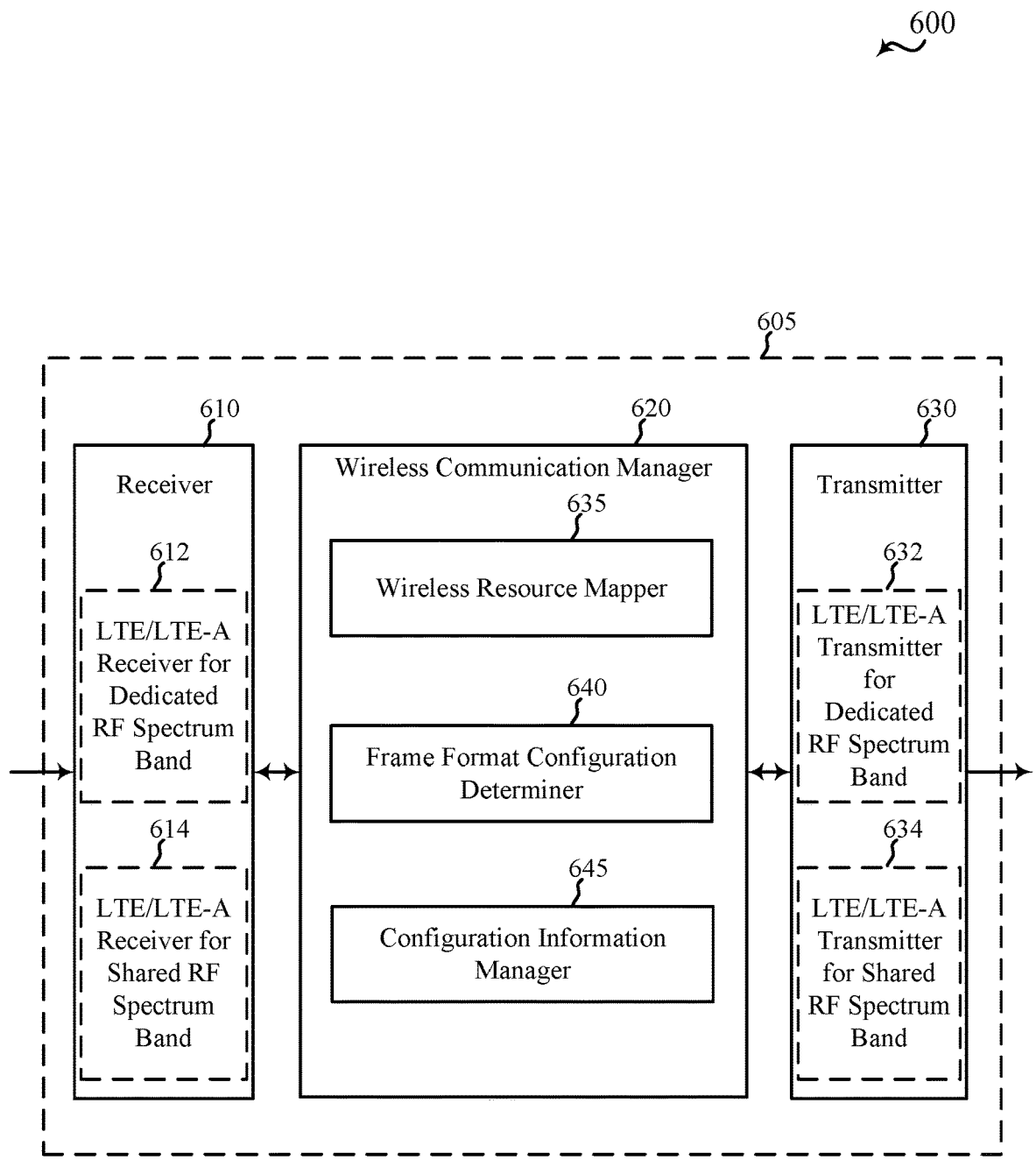
FIG. 6 shows a block diagram of an apparatus for use in wireless communication, in accordance with various aspects of the present disclosure.

FIG. 6 shows a block diagram 600 of an apparatus 605 for use in wireless communication, in accordance with various aspects of the present disclosure. The apparatus 605 may be an example of aspects of one or more of the UE 115 described with reference to FIG. 1, the UE 215 described with reference to FIG. 2 or the UE 515 described with reference to FIG. 5. The apparatus 605 may also be or include a processor. The apparatus 605 may include a receiver 610, a wireless communication manager 620, or a transmitter 630. Each of these components may be in communication with each other.

The components of the apparatus 605 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 610 may include at least one RF receiver, such as at least one RF receiver operable to receive transmissions over a dedicated radio frequency spectrum band (e.g., a radio frequency spectrum band for which transmitting apparatuses may not contend for access because the radio frequency spectrum band is licensed to particular users for particular uses) or a shared radio frequency spectrum band (e.g., a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner)). In some examples, the dedicated radio frequency spectrum band or the shared radio frequency spectrum band may be used for LTE/LTE-A communications, as described, for example, with reference to FIG. 1, 2, 3, 4, or 5. The receiver 610 may in some cases include separate receivers for the dedicated radio frequency spectrum band and the shared radio frequency spectrum band. The separate receivers may, in some examples, take the form of an LTE/LTE-A receiver for communicating over the dedicated radio frequency spectrum band (e.g., LTE/LTE-A receiver for dedicated RF spectrum band 612), and an LTE/LTE-A receiver for communicating over the shared radio frequency spectrum band (e.g., LTE/LTE-A receiver for shared RF spectrum band 614). The receiver 610, including the LTE/LTE-A receiver for dedicated RF spectrum band 612 or the LTE/LTE-A receiver for shared RF spectrum band 614, may be used to receive various types of data or control signals (i.e., transmissions) over one or more communication links of a wireless communication system, such as one or more communication links of the wireless communication system 100 described with reference to FIG. 1 or the wireless communication system 200 described with reference to FIG. 2. The communication links may be established over the dedicated radio frequency spectrum band or the shared radio frequency spectrum band.

In some examples, the transmitter 630 may include at least one RF transmitter, such as at least one RF transmitter operable to transmit over the dedicated radio frequency spectrum band or the shared radio frequency spectrum band. The transmitter 630 may in some cases include separate transmitters for the dedicated radio frequency spectrum band and the shared radio frequency spectrum band. The separate transmitters may, in some examples, take the form of an LTE/LTE-A transmitter for communicating over the dedicated radio frequency spectrum band (e.g., LTE/LTE-A transmitter for dedicated RF spectrum band 632), and an LTE/LTE-A transmitter for communicating over the shared radio frequency spectrum band (e.g., LTE/LTE-A transmitter for shared RF spectrum band 634). The transmitter 630, including the LTE/LTE-A transmitter for dedicated RF spectrum band 632 or the LTE/LTE-A transmitter for shared RF spectrum band 634, may be used to transmit various types of data or control signals (i.e., "data" or transmissions) over one or more communication links of a wireless communication system, such as one or more communication links of the wireless communication system 100 described with reference to FIG. 1 or the wireless communication system 200 described with reference to FIG. 2. The communication links may be established over the dedicated radio frequency spectrum band or the shared radio frequency spectrum band.

In some examples, the wireless communication manager 620 may be used to manage one or more aspects of wireless communication for the apparatus 605. In some examples, part of the wireless communication manager 620 may be incorporated into or shared with the receiver 610 or the transmitter 630. In some examples, the wireless communication manager 620 may include a wireless resource mapper 635, a frame format configuration determiner 640, and a configuration information manager 645.

In some examples, the wireless resource mapper 635 may be used to identify a first subset of wireless resources of a channel for signaling first configuration information to a first user equipment (UE) group, and may identify a second subset of wireless resources of the channel for signaling second configuration information to a second UE group, the first configuration information and the second configuration information including one or more parameters for wireless communications using a shared radio frequency spectrum band. In some examples, the transmitter 630 may transmit the first configuration information using the first subset of wireless resources and the second configuration information using the second subset of wireless resources. In some examples, the channel may include a PHICH, a PCFICH, a PDCCH, or combinations thereof. In some examples, the first configuration information may be signaled using the PHICH and the second configuration information may be signaled using one or more of the PCFICH or the PDCCH. In other examples, the first configuration information may be signaled using the PHICH and the second configuration information may be signaled using the PHICH. The wireless resource mapper 635 also may determine a mapping of the first subset of frame format parameters to the first subset of wireless resources and the second subset of the frame format parameters to the second subset of wireless resources.

The frame format configuration determiner 640 may be used to determine a frame format for a transmission. Such a frame format determination may be based on particular data or UEs that are to receive data, for example. In some examples, the frame format configuration determiner 640 may determine the first configuration information, which may include a first subset of a set of frame format parameters to be used by UEs of the first UE group, and may determine the second configuration information which may include a second subset of the set of frame format parameters to be used by UEs of the second UE group.

The configuration information manager 645 may determine configuration information based at least in part on the determined frame format for the transmission. For example, the configuration information may include frame format parameter values for the frame format parameters of one or more subsets of frame format parameters to be used by UEs of the first UE group or the second UE group.

Figure 7:
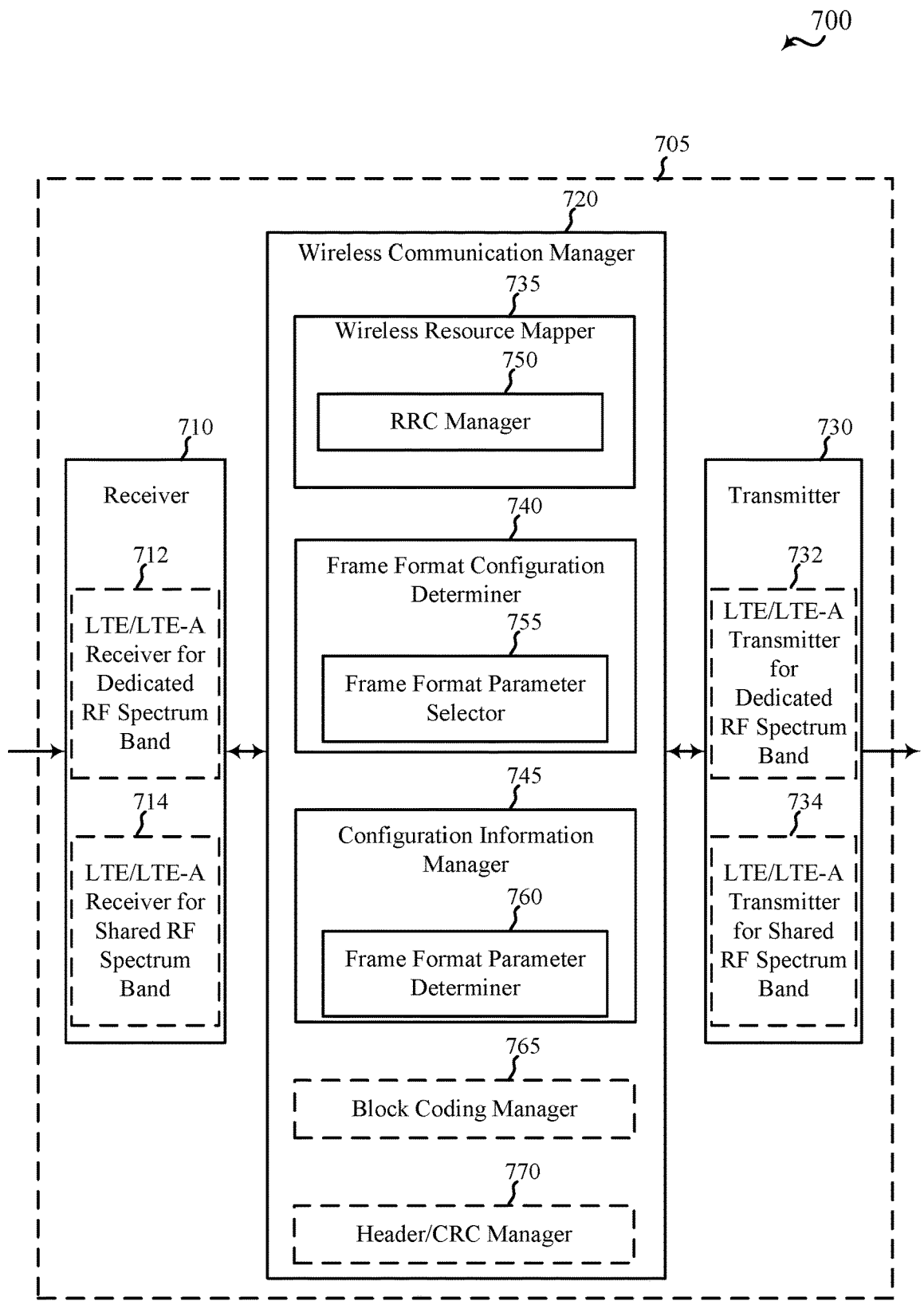
FIG. 7 shows a block diagram of an apparatus for use in wireless communication, in accordance with various aspects of the present disclosure.

FIG. 7 shows a block diagram 700 of an apparatus 705 for use in wireless communication, in accordance with various aspects of the present disclosure. The apparatus 705 may be an example of aspects of one or more of the UE 115 described with reference to FIG. 1, the UE 215 described with reference to FIG. 2 or the UE 515 described with reference to FIG. 5 or aspects of the apparatus 605 described with reference to FIG. 6. The apparatus 705 may also be or include a processor. The apparatus 705 may include a receiver 710, a wireless communication manager 720, or a transmitter 730. Each of these components may be in communication with each other.

The components of the apparatus 705 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 710 may include at least one RF receiver, such as at least one RF receiver operable to receive transmissions over a dedicated radio frequency spectrum band (e.g., a radio frequency spectrum band for which transmitting apparatuses may not contend for access because the radio frequency spectrum band is licensed to particular users for particular uses) or a shared radio frequency spectrum band (e.g., a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner)). In some examples, the dedicated radio frequency spectrum band or the shared radio frequency spectrum band may be used for LTE/LTE-A communications, as described, for example, with reference to FIG. 1, 2, 3, 4, or 5. The receiver 710 may in some cases include separate receivers for the dedicated radio frequency spectrum band and the shared radio frequency spectrum band. The separate receivers may, in some examples, take the form of an LTE/LTE-A receiver for communicating over the dedicated radio frequency spectrum band (e.g., LTE/LTE-A receiver for dedicated RF spectrum band 712), and an LTE/LTE-A receiver for communicating over the shared radio frequency spectrum band (e.g., LTE/LTE-A receiver for shared RF spectrum band 714). The receiver 710, including the LTE/LTE-A receiver for dedicated RF spectrum band 712 or the LTE/LTE-A receiver for shared RF spectrum band 714, may be used to receive various types of data or control signals (i.e., transmissions) over one or more communication links of a wireless communication system, such as one or more communication links of the wireless communication system 100 described with reference to FIG. 1 or the wireless communication system 200 described with reference to FIG. 2. The communication links may be established over the dedicated radio frequency spectrum band or the shared radio frequency spectrum band.

In some examples, the transmitter 730 may include at least one RF transmitter, such as at least one RF transmitter operable to transmit over the dedicated radio frequency spectrum band or the shared radio frequency spectrum band. The transmitter 730 may in some cases include separate transmitters for the dedicated radio frequency spectrum band and the shared radio frequency spectrum band. The separate transmitters may, in some examples, take the form of an LTE/LTE-A transmitter for communicating over the dedicated radio frequency spectrum band (e.g., LTE/LTE-A transmitter for dedicated RF spectrum band 732), and an LTE/LTE-A transmitter for communicating over the shared radio frequency spectrum band (e.g., LTE/LTE-A transmitter for shared RF spectrum band 734). The transmitter 730, including the LTE/LTE-A transmitter for dedicated RF spectrum band 732 or the LTE/LTE-A transmitter for shared RF spectrum band 734, may be used to transmit various types of data or control signals (i.e., "data" or transmissions) over one or more communication links of a wireless communication system, such as one or more communication links of the wireless communication system 100 described with reference to FIG. 1 or the wireless communication system 200 described with reference to FIG. 2. The communication links may be established over the dedicated radio frequency spectrum band or the shared radio frequency spectrum band.

In some examples, the wireless communication manager 720 may be used to manage one or more aspects of wireless communication for the apparatus 705. In some examples, part of the wireless communication manager 720 may be incorporated into or shared with the receiver 710 or the transmitter 730. In some examples, the wireless communication manager 720 may include a wireless resource mapper 735, a frame format configuration determiner 740, and a configuration information manager 745. In some examples, the communication manager 720 may also include one or more of optional block coding manager 765 or optional header/CRC manager 770.

The wireless resource mapper 735 may be an example of wireless resource mapper 635 of FIG. 6, and also may include an RRC manager 750. In some examples, the RRC manager 750 may manage configuration of UEs to monitor one of the first subset of resources or the second subset of resources. Such configuration may be provided through transmission of RRC information to the UEs, that may indicate which of the first subset of resources or the second subset of resources the UE is to monitor. In some examples, the RRC manager may provide RRC information that includes a mapping of the first subset of the set of frame format parameters and the second subset of the set of the frame format parameters that is to be provided to the first UE group and the second UE group via RRC signaling.

The frame format configuration determiner 740 may be an example of frame format configuration determiner 640 of FIG. 6, and also may include a frame format parameter selector 755. In some examples, the frame format parameter selector 755 may select various different frame format parameters that are to be included with frame format configuration information. In some examples, the frame format parameter selector 755 may provide the first configuration information which may include a set of frame format parameters. In some examples, the frame format parameter selector 755 may select parameters for the second configuration information, which may include at least one overlapping parameter with the set of frame format parameters, and that may have a different parameter value (e.g., a time duration for not monitoring downlink transmissions that may be different for the first UE group and the second UE group). In some examples, the frame format parameter selector 755 may select parameters from the set of frame format parameters that may include one or more of a MBSFN subframe type parameter, a partial subframe information parameter, a downlink/uplink configuration parameter, a downlink transmission burst length parameter, a time duration for uplink transmissions parameter, a time duration for which a UE stops monitoring downlink transmissions parameter, a reference signal power variation parameter, an aperiodic CSI-RS presence parameter or a DRS presence indication and configuration, a system information presence parameter, or a do not monitor subframe parameter. In some examples, the first configuration information or the second configuration information may include information for a current subframe and at least one subsequent subframe. In other examples, the first configuration information or the second configuration information may include power variation information to indicate a power variation between two or more subframes.

The configuration information manager 745 may be an example of configuration information manager 645 as described with reference to FIG. 6, and also may include a frame format parameter determiner 760. In some examples, the frame format parameter determiner 760 may determine parameter values for the parameters that are selected by frame format parameter selector 755. For example, frame format parameter determiner 760 may determine parameter values based on particular characteristics of transmissions of the particular subframe. In some examples, the frame format parameter determiner 760 may provide parameter values for parameters from the set of frame format parameters, that may include particular values for one or more of a MBSFN subframe type parameter, a partial subframe information parameter, a downlink/uplink configuration parameter, a downlink transmission burst length parameter, a time duration for uplink transmissions parameter, a time duration for which a UE stops monitoring downlink transmissions parameter, a reference signal power variation parameter, an aperiodic CSI-RS presence parameter or a DRS presence indication and configuration, a system information presence parameter, or a do not monitor subframe parameter. Furthermore, such parameter values may be different based on the UE group to which the parameter is to be applied.

In some examples, the block coding manager 765 may provide block coding for the first configuration information and the second configuration information. In some examples, the block coding may be Reed Muller block coding. In some examples, the block coding may be applied separately to the first configuration information and the second configuration information.

In some examples, the header/CRC manager 770 may compute a CRC for configuration information to be transmitted, and/or may determine a header to be included with a transmission of the configuration information. In some examples, the header/CRC manager 770 may calculate a first CRC for the first configuration information and a second CRC for the second configuration information, and append the first CRC to the first configuration information and the second CRC to the second configuration information. In some examples, the header/CRC manager 770 may also scramble the first CRC with a first RNTI that is assigned to the first UE group and scramble the second CRC with a second RNTI that is assigned to the second UE group. The header/CRC manager 770 may also, in some examples, determine a header that indicates a size of the first configuration information or second configuration information and that is to be transmitted with the configuration information. In some examples, the header may be a two-bit header that provides an indication of one of four available payload sizes for the data included with the transmitted configuration information.

Figure 8:
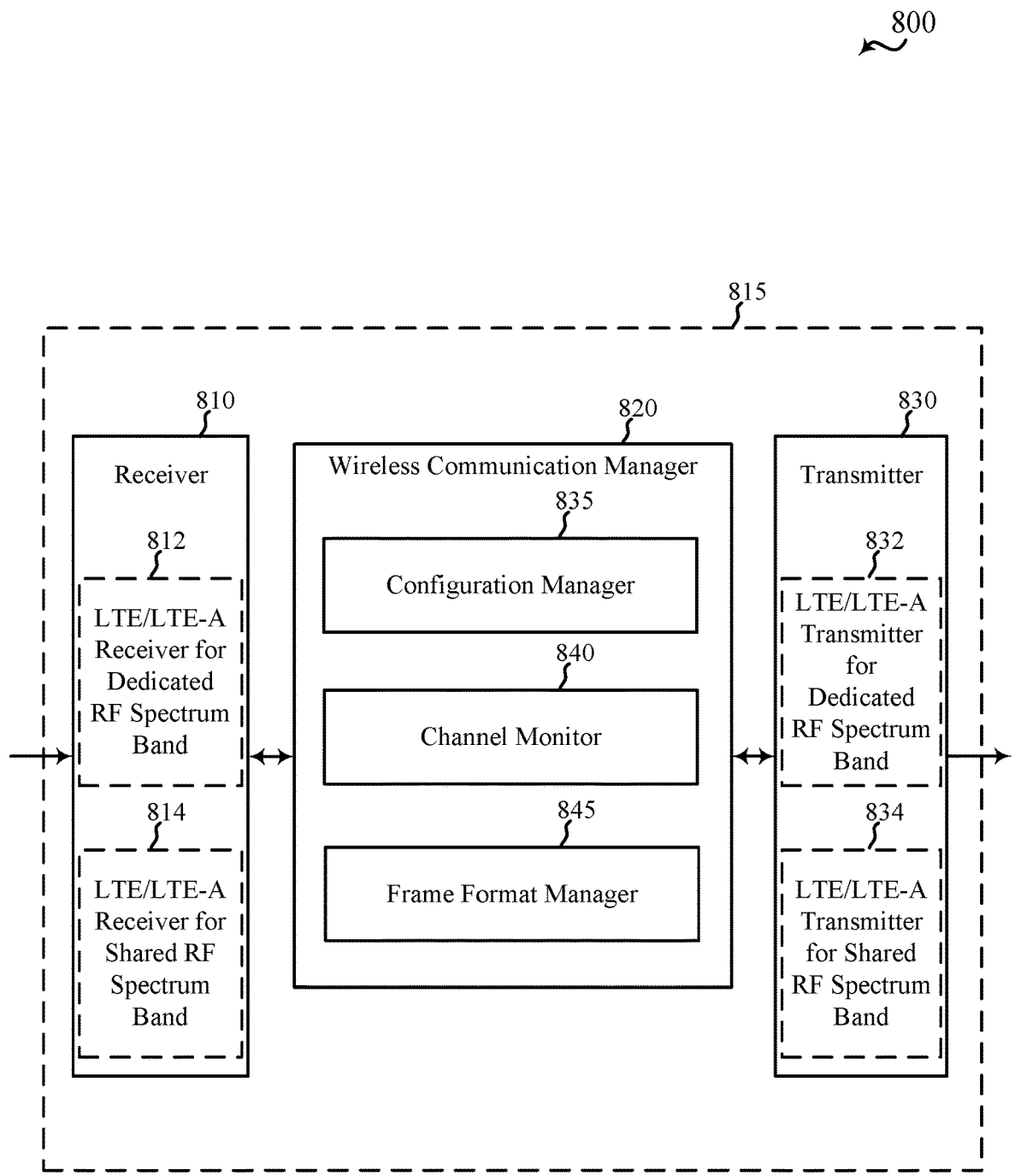
FIG. 8 shows a block diagram of an apparatus for use in wireless communication, in accordance with various aspects of the present disclosure.

FIG. 8 shows a block diagram 800 of an apparatus 815 for use in wireless communication, in accordance with various aspects of the present disclosure. The apparatus 815 may be an example of aspects of one or more of the base station 105 described with reference to FIG. 1, the base station 205 described with reference to FIG. 2 or the base station 505 described with reference to FIG. 5. The apparatus 815 may also be or include a processor. The apparatus 815 may include a receiver 810, a wireless communication manager 820, or a transmitter 830. Each of these components may be in communication with each other.

The components of the apparatus 815 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 810 may include at least one RF receiver, such as at least one RF receiver operable to receive transmissions over a dedicated radio frequency spectrum band (e.g., a radio frequency spectrum band for which transmitting apparatuses may not contend for access because the radio frequency spectrum band is licensed to particular users for particular uses) or a shared radio frequency spectrum band (e.g., a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner)). In some examples, the dedicated radio frequency spectrum band or the shared radio frequency spectrum band may be used for LTE/LTE-A communications, as described, for example, with reference to FIG. 1, 2, 3, 4, or 5. The receiver 810 may in some cases include separate receivers for the dedicated radio frequency spectrum band and the shared radio frequency spectrum band. The separate receivers may, in some examples, take the form of an LTE/LTE-A receiver for communicating over the dedicated radio frequency spectrum band (e.g., LTE/LTE-A receiver for dedicated RF spectrum band 812), and an LTE/LTE-A receiver for communicating over the shared radio frequency spectrum band (e.g., LTE/LTE-A receiver for shared RF spectrum band 814). The receiver 810, including the LTE/LTE-A receiver for dedicated RF spectrum band 812 or the LTE/LTE-A receiver for shared RF spectrum band 814, may be used to receive various types of data or control signals (i.e., "data" or transmissions) over one or more communication links of a wireless communication system, such as one or more communication links of the wireless communication system 100 described with reference to FIG. 1 or the wireless communication system 200 described with reference to FIG. 2. The communication links may be established over the dedicated radio frequency spectrum band or the shared radio frequency spectrum band.

In some examples, the transmitter 830 may include at least one RF transmitter, such as at least one RF transmitter operable to transmit over the dedicated radio frequency spectrum band or the shared radio frequency spectrum band. The transmitter 830 may in some cases include separate transmitters for the dedicated radio frequency spectrum band and the shared radio frequency spectrum band. The separate transmitters may, in some examples, take the form of an LTE/LTE-A transmitter for communicating over the dedicated radio frequency spectrum band (e.g., LTE/LTE-A transmitter for dedicated RF spectrum band 832), and an LTE/LTE-A transmitter for communicating over the shared radio frequency spectrum band (e.g., LTE/LTE-A transmitter for shared RF spectrum band 834). The transmitter 830, including the LTE/LTE-A transmitter for dedicated RF spectrum band 832 or the LTE/LTE-A transmitter for shared RF spectrum band 834, may be used to transmit various types of data or control signals (i.e., "data" or transmissions) over one or more communication links of a wireless communication system, such as one or more communication links of the wireless communication system 100 described with reference to FIG. 1 or the wireless communication system 200 described with reference to FIG. 2. The communication links may be established over the dedicated radio frequency spectrum band or the shared radio frequency spectrum band.

In some examples, the wireless communication manager 820 may be used to manage one or more aspects of wireless communication for the apparatus 815. In some examples, part of the wireless communication manager 820 may be incorporated into or shared with the receiver 810 or the transmitter 830. In some examples, the wireless communication manager 820 may include configuration manager 835, a channel monitor 840 or frame format manager 845.

The configuration manager 835 may be used to determine configuration information identifying a subset of a set of wireless resources of a channel that contain frame format information for one or more subframes, the frame format information comprising one or more parameters for wireless communications using a shared radio frequency spectrum band. In some examples, the configuration information may be received through RRC signaling from a base station. The channel monitor 840 may be used to monitor the identified subset of wireless resources. The identified subset of wireless resources may include resources of a physical layer channel, such as resources of a PHICH, PCFICH, or PDCCH, for example. In some examples, a first portion of the frame format information may be received on the PHICH and a second portion of the frame format information may be received on the PCFICH or the PDCCH. Of course, other combinations of physical layer channels may be used for such transmissions as well.

The frame format manager 845 may be used to determine the frame format information that is received on the subset of wireless resources. In some examples, the frame format information may include one or more physical layer parameters, such as one or more of a MBSFN subframe type parameter, a partial subframe information parameter, a downlink/uplink configuration parameter, a downlink transmission burst length parameter, a time duration for uplink transmissions parameter, a time duration for which a UE stops monitoring downlink transmissions parameter, a reference signal power variation parameter, an aperiodic CSI-RS presence parameter or a DRS presence indication and configuration, a system information presence parameter, or a do not monitor subframe parameter. The particular parameters received by apparatus 815 may be identified by a mapping that may be received at the configuration manager, for example, that maps monitored resources to particular frame format parameters.

Figure 9:
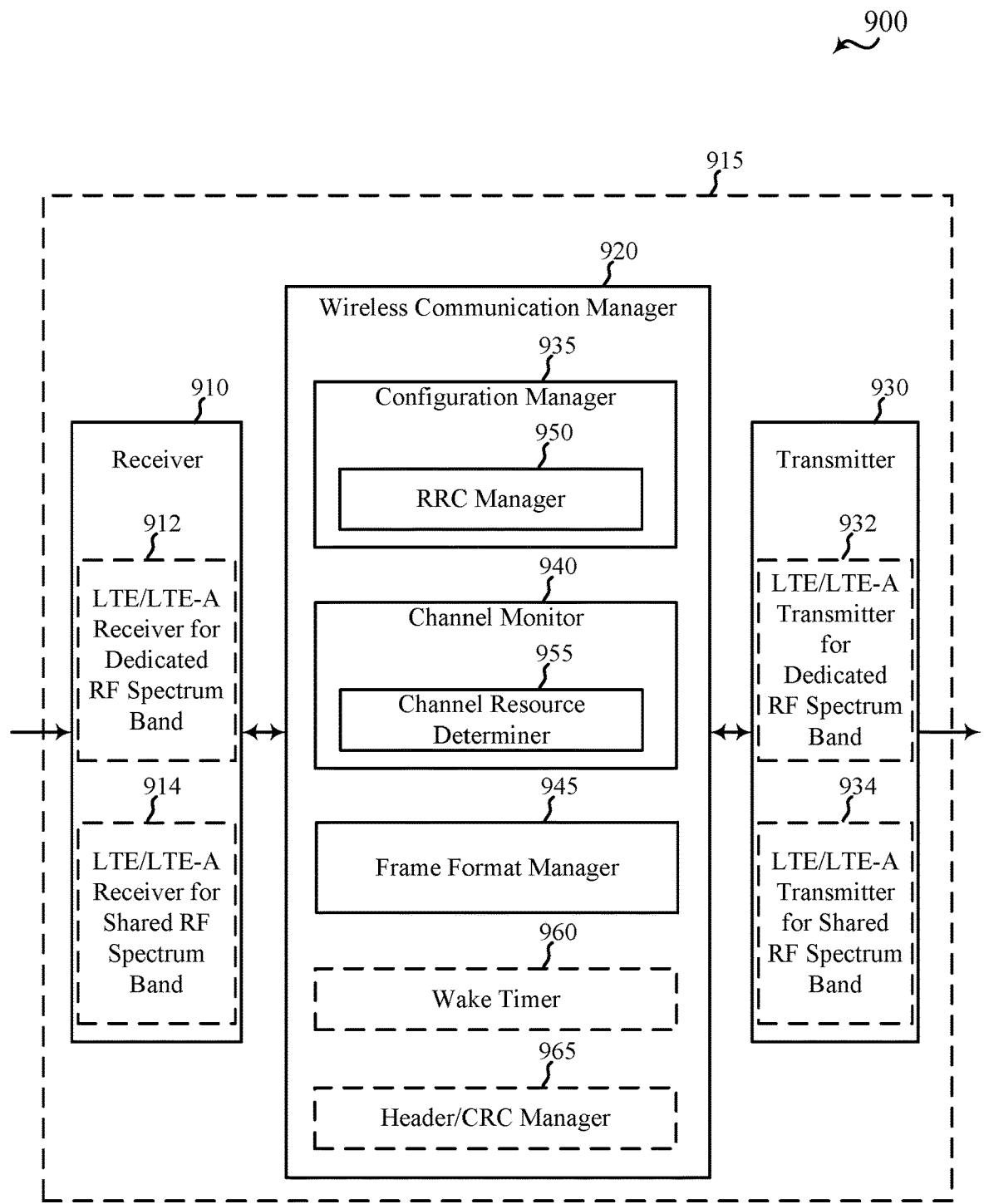
FIG. 9 shows a block diagram of an apparatus for use in wireless communication, in accordance with various aspects of the present disclosure.

FIG. 9 shows a block diagram 900 of an apparatus 915 for use in wireless communication, in accordance with various aspects of the present disclosure. The apparatus 915 may be an example of aspects of one or more of the UE 115 described with reference to FIG. 1, the UE 215 described with reference to FIG. 2 or the UE 515 described with reference to FIG. 5, or aspects of the apparatus 815 described with reference to FIG. 8. The apparatus 915 may also be or include a processor. The apparatus 915 may include a receiver 910, a wireless communication manager 920, or a transmitter 930. Each of these components may be in communication with each other.

The components of the apparatus 915 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 910 may include at least one RF receiver, such as at least one RF receiver operable to receive transmissions over a dedicated radio frequency spectrum band (e.g., a radio frequency spectrum band for which transmitting apparatuses may not contend for access because the radio frequency spectrum band is licensed to particular users for particular uses) or a shared radio frequency spectrum band (e.g., a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner)). In some examples, the dedicated radio frequency spectrum band or the shared radio frequency spectrum band may be used for LTE/LTE-A communications, as described, for example, with reference to FIG. 1, 2, 3, 4, or 5. The receiver 910 may in some cases include separate receivers for the dedicated radio frequency spectrum band and the shared radio frequency spectrum band. The separate receivers may, in some examples, take the form of an LTE/LTE-A receiver for communicating over the dedicated radio frequency spectrum band (e.g., LTE/LTE-A receiver for dedicated RF spectrum band 912), and an LTE/LTE-A receiver for communicating over the shared radio frequency spectrum band (e.g., LTE/LTE-A receiver for shared RF spectrum band 914). The receiver 910, including the LTE/LTE-A receiver for dedicated RF spectrum band 912 or the LTE/LTE-A receiver for shared RF spectrum band 914, may be used to receive various types of data or control signals (i.e., "data" or transmissions) over one or more communication links of a wireless communication system, such as one or more communication links of the wireless communication system 100 described with reference to FIG. 1 or the wireless communication system 200 described with reference to FIG. 2. The communication links may be established over the dedicated radio frequency spectrum band or the shared radio frequency spectrum band.

In some examples, the transmitter 930 may include at least one RF transmitter, such as at least one RF transmitter operable to transmit over the dedicated radio frequency spectrum band or the shared radio frequency spectrum band. The transmitter 930 may in some cases include separate transmitters for the dedicated radio frequency spectrum band and the shared radio frequency spectrum band. The separate transmitters may, in some examples, take the form of an LTE/LTE-A transmitter for communicating over the dedicated radio frequency spectrum band (e.g., LTE/LTE-A transmitter for dedicated RF spectrum band 932), and an LTE/LTE-A transmitter for communicating over the shared radio frequency spectrum band (e.g., LTE/LTE-A transmitter for shared RF spectrum band 934). The transmitter 930, including the LTE/LTE-A transmitter for dedicated RF spectrum band 932 or the LTE/LTE-A transmitter for shared RF spectrum band 934, may be used to transmit various types of data or control signals (i.e., "data" or transmissions) over one or more communication links of a wireless communication system, such as one or more communication links of the wireless communication system 100 described with reference to FIG. 1 or the wireless communication system 200 described with reference to FIG. 2. The communication links may be established over the dedicated radio frequency spectrum band or the shared radio frequency spectrum band.

In some examples, the wireless communication manager 920 may be used to manage one or more aspects of wireless communication for the apparatus 915. In some examples, part of the wireless communication manager 920 may be incorporated into or shared with the receiver 910 or the transmitter 930. In some examples, the wireless communication manager 920 may include configuration manager 935, a channel monitor 940 or frame format manager 945. The wireless communication manager 920 may also include, in some examples, an optional wake timer 960 or an optional header/CRC manager 965.

The configuration manager 935 may be an example of configuration manager 835 of FIG. 8, and also may include an RRC manager 950. In some examples, the RRC manager 950 may receive RRC configuration information that may include configuration information indicating physical channel resources to monitor for frame format information. In some examples, the RRC manager may include or be provided with a mapping of frame format parameters that are to be provided in monitored resources.

The channel monitor 940 may be an example of channel monitor 840 of FIG. 8, and also may include a channel resource determiner 955. In some examples, the channel resource determiner 955 receive the mapping of the frame format parameters from the RRC manager 950 and may determine the particular physical channel resources that are to be monitored by channel monitor 940. For example, the channel resource determiner 955 may determine that one or more PHICH, PCFICH, or PDCCH resources, or combinations thereof, are to be monitored by the channel monitor 940. The frame format manager 945 may be an example of frame format manager 845 of FIG. 8, and may perform similar functions. The optional wake timer 960 may, in some examples, receive a time duration for which the apparatus 915 is not to monitor for downlink transmissions, and provide an indication when the apparatus 915 is to wake up to monitor downlink transmissions following the time duration. Optional header/CRC manager 965 may receive one or both of header information or CRC information. Header information, as discussed above, may include information on an amount of data in a payload of the frame format information. CRC information may include a CRC value that may be used by the header/CRC manager 965 to confirm reliable reception of data and may improve reliability of received data.

Figure 10:
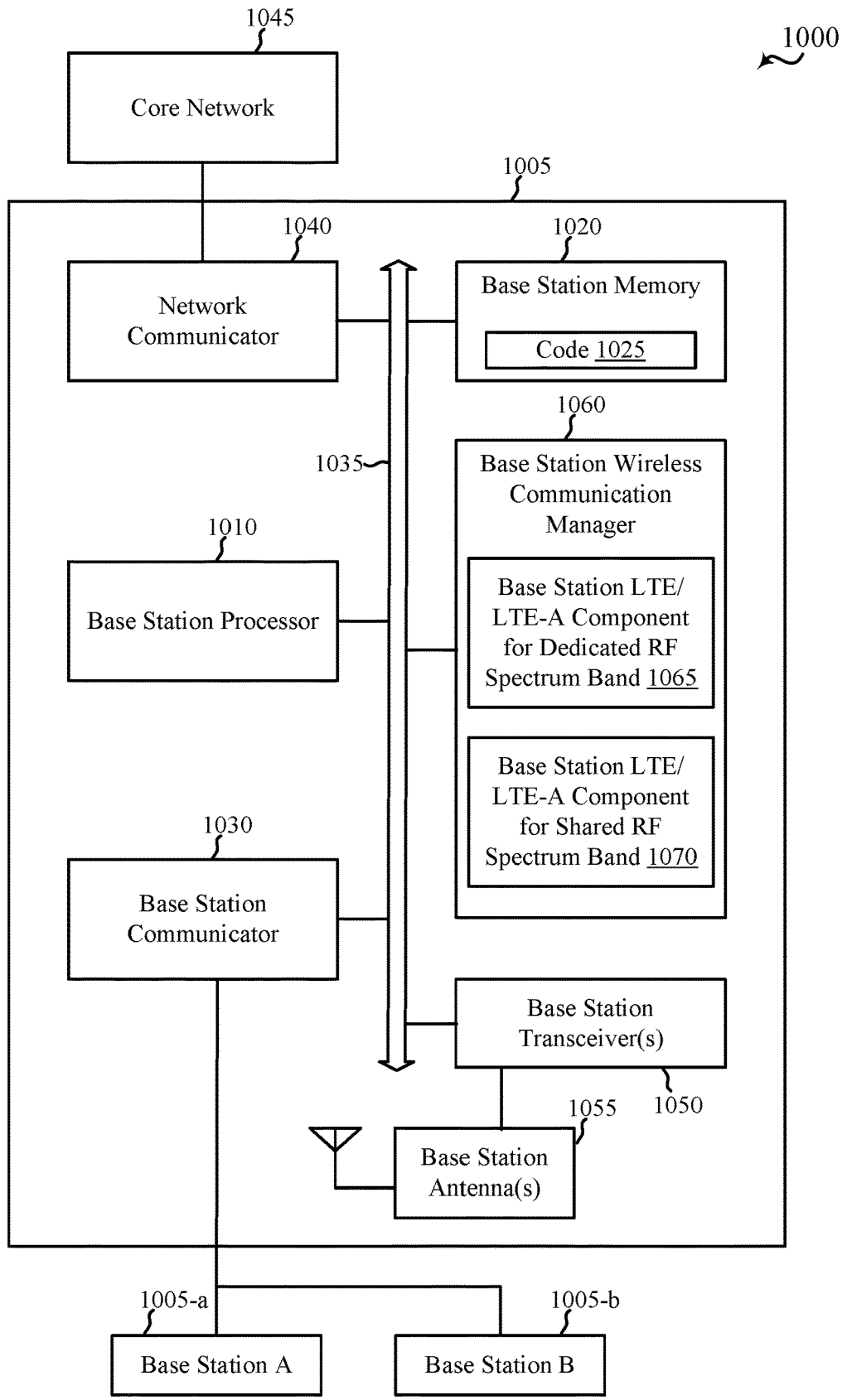
FIG. 10 shows a block diagram of a base station (e.g., a base station forming part or all of an eNB) for use in wireless communication, in accordance with various aspects of the present disclosure.

FIG. 10 shows a block diagram 1000 of a base station 1005 (e.g., a base station forming part or all of an eNB) for use in wireless communication, in accordance with various aspects of the present disclosure. In some examples, the base station 1005 may be an example of one or more aspects of the base station 105 described with reference to FIG. 1, the base station 205 described with reference to FIG. 2 or the base station 505 described with reference to FIG. 5, or aspects of one or more of the apparatus 605 described with reference to FIG. 6 or the apparatus 705 described with reference to FIG. 7. The base station 1005 may be configured to implement or facilitate at least some of the base station techniques and functions described with reference to FIG. 1, 2, 3, 4, 5, 6, or 7.

The base station 1005 may include a base station processor 1010, a base station memory 1020, at least one base station transceiver (represented by base station transceiver(s) 1050), at least one base station antenna (represented by base station antenna(s) 1055), or a base station wireless communication manager 1060. The base station 1005 may also include one or more of a base station communicator 1030 or a network communicator 1040. Each of these components may be in communication with each other, directly or indirectly, over one or more buses 1035.

The base station memory 1020 may include random access memory (RAM) or read-only memory (ROM). The base station memory 1020 may store computer-readable, computer-executable code 1025 containing instructions that are configured to, when executed, cause the base station processor 1010 to perform various functions described herein related to wireless communication, including, for example, signaling of physical layer parameters in a shared radio frequency spectrum band or a dedicated radio frequency spectrum band for multiple UE groups that may be served by the base station 1005. Alternatively, the computer-executable code 1025 may not be directly executable by the base station processor 1010 but be configured to cause the base station 1005 (e.g., when compiled and executed) to perform various of the functions described herein.

The base station processor 1010 may include an intelligent hardware device, e.g., a central processing unit (CPU), a microcontroller, an ASIC, etc. The base station processor 1010 may process information received through the base station transceiver(s) 1050, the base station communicator 1030, or the network communicator 1040. The base station processor 1010 may also process information to be sent to the transceiver(s) 1050 for transmission through the antenna(s) 1055, to the base station communicator 1030, for transmission to one or more other base stations (e.g., base station A 1005-*a* and base station B 1005-*b*), or to the network communicator 1040 for transmission to a core network 1045, which may be an example of one or more aspects of the core network 130 described with reference to FIG. 1. The base station processor 1010 may handle, alone or in connection with the base station wireless communication manager 1060, various aspects of communicating over (or managing communications over) a dedicated radio frequency spectrum band or a shared radio frequency spectrum band. The dedicated radio frequency spectrum band may include a radio frequency spectrum band for which transmitting apparatuses may not contend for access (e.g., a radio frequency spectrum band licensed to particular users for particular uses, such as a licensed radio frequency spectrum band usable for LTE/LTE-A communications). The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner).

The base station transceiver(s) 1050 may include a modem configured to modulate packets and provide the modulated packets to the base station antenna(s) 1055 for transmission, and to demodulate packets received from the base station antenna(s) 1055. The base station transceiver(s) 1050 may, in some examples, be implemented as one or more base station transmitters and one or more separate base station receivers. The base station transceiver(s) 1050 may support communications in the dedicated radio frequency spectrum band or the shared radio frequency spectrum band. The base station transceiver(s) 1050 may be configured to communicate bi-directionally, via the antenna(s) 1055, with one or more UEs or apparatuses, such as one or more of the UE 115 described with reference to FIG. 1, the UE 215 described with reference to FIG. 2 or the UE 515 described with reference to FIG. 5, or the apparatus 815 described with reference to FIG. 8 or the apparatus 915 described with reference to FIG. 9. The base station 1005 may, for example, include multiple base station antennas 1055 (e.g., an antenna array). The base station 1005 may communicate with the core network 1045 through the network communicator 1040. The base station 1005 may also communicate with other base stations, such as the base station A 1005-*a* and the base station B 1005-*b*, using the base station communicator 1030.

The base station wireless communication manager 1060 may be configured to perform or control some or all of the techniques or functions described with reference to FIG. 1, 2, 3, 4, 5, 6, or 7 related to wireless communication over the dedicated radio frequency spectrum band or the shared radio frequency spectrum band. For example, the base station wireless communication manager 1060 may be configured to provide signaling of physical layer parameters in a shared radio frequency spectrum band or a dedicated radio frequency spectrum band using physical channel resources allocated to different UE groups. The base station wireless communication manager 1060 may include a base station LTE/LTE-A component for dedicated RF spectrum band 1065 configured to handle LTE/LTE-A communications in the dedicated radio frequency spectrum band, and a base station LTE/LTE-A component for shared RF spectrum band 1070 configured to handle LTE/LTE-A communications in the shared radio frequency spectrum band. The base station wireless communication manager 1060, or portions of it, may include a processor, or some or all of the functions of the base station wireless communication manager 1060 may be performed by the base station processor 1010 or in connection with the base station processor 1010. In some examples, the base station wireless communication manager 1060 may be an example of the wireless communication manager 620 described with reference to FIG. 6 or the wireless communication manager 720 described with reference to FIG. 7.

Figure 11:
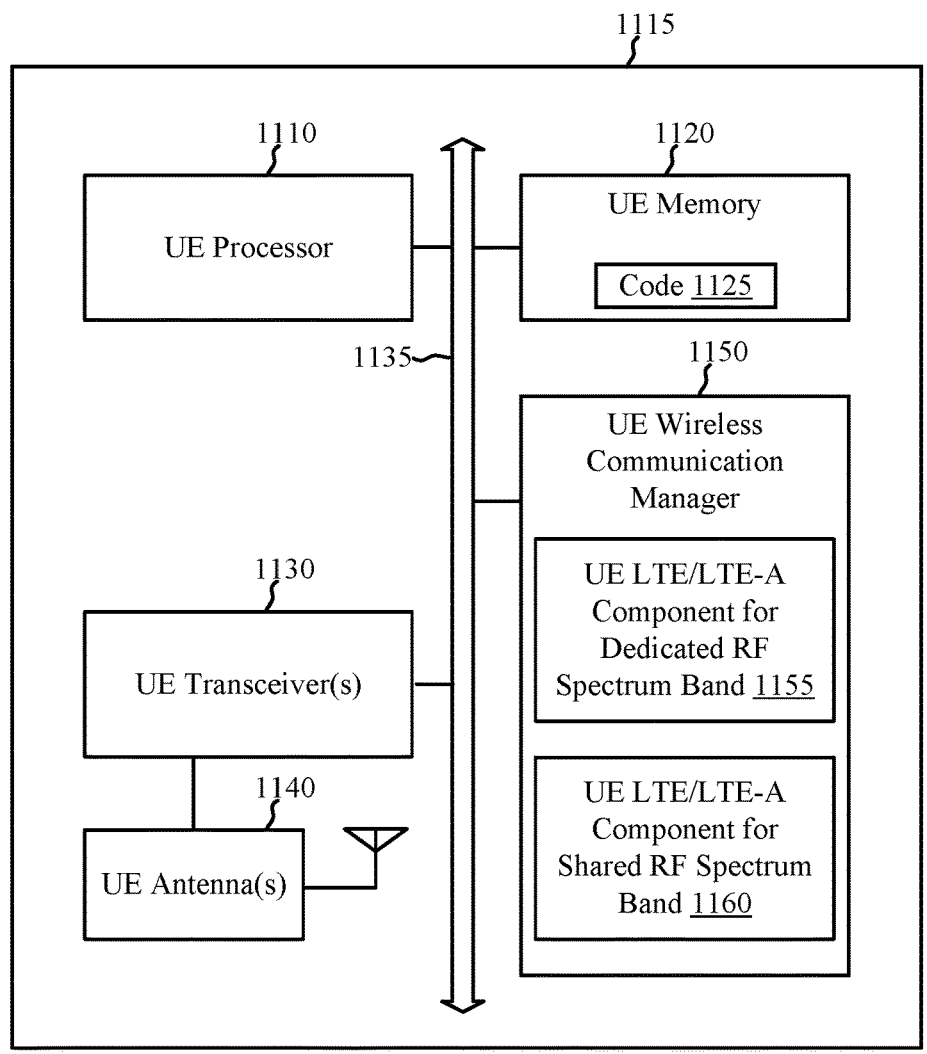
FIG. 11 shows a block diagram of a UE for use in wireless communication, in accordance with various aspects of the present disclosure.

FIG. 11 shows a block diagram 1100 of a UE 1115 for use in wireless communication, in accordance with various aspects of the present disclosure. The UE 1115 may be included or be part of a personal computer (e.g., a laptop computer, a netbook computer, a tablet computer, etc.), a cellular telephone, a PDA, a DVR, an internet appliance, a gaming console, an e-reader, etc. The UE 1115 may, in some examples, have an internal power supply (not shown), such as a small battery, to facilitate mobile operation. In some examples, the UE 1115 may be an example of aspects of one or more of the UE 115 described with reference to FIG. 1, the UE 215 described with reference to FIG. 2 or the UE 515 described with reference to FIG. 5, or aspects of the apparatus 815 described with reference to FIG. 8 or the apparatus 915 described with reference to FIG. 9. The UE 1115 may be configured to implement at least some of the UE or apparatus techniques and functions described with reference to FIG. 1, 2, 3, 4, 5, 8, or 9.

The UE 1115 may include a UE processor 1110, a UE memory 1120, at least one UE transceiver (represented by UE transceiver(s) 1130), at least one UE antenna (represented by UE antenna(s) 1140), or a UE wireless communication manager 1150. Each of these components may be in communication with each other, directly or indirectly, over one or more buses 1135.

The UE memory 1120 may include RAM or ROM. The UE memory 1120 may store computer-readable, computer-executable code 1125 containing instructions that are configured to, when executed, cause the UE processor 1110 to perform various functions described herein related to wireless communication, including, for example, receiving configuration information for monitoring physical channel resources for physical parameters of various subframe transmissions. Alternatively, the computer-executable code 1125 may not be directly executable by the UE processor 1110 but be configured to cause the UE 1115 (e.g., when compiled and executed) to perform various of the functions described herein.

The UE processor 1110 may include an intelligent hardware device, e.g., a CPU, a microcontroller, an ASIC, etc. The UE processor 1110 may process information received through the UE transceiver(s) 1130 or information to be sent to the UE transceiver(s) 1130 for transmission through the UE antenna(s) 1140. The UE processor 1110 may handle, alone or in connection with the UE wireless communication manager 1150, various aspects of communicating over (or managing communications over) a dedicated radio frequency spectrum band or a shared radio frequency spectrum band. The dedicated radio frequency spectrum band may include a radio frequency spectrum band for which transmitting apparatuses may not contend for access (e.g., a radio frequency spectrum band licensed to particular users for particular uses, such as a licensed radio frequency spectrum band usable for LTE/LTE-A communications). The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner).

The UE transceiver(s) 1130 may include a modem configured to modulate packets and provide the modulated packets to the UE antenna(s) 1140 for transmission, and to demodulate packets received from the UE antenna(s) 1140. The UE transceiver(s) 1130 may, in some examples, be implemented as one or more UE transmitters and one or more separate UE receivers. The UE transceiver(s) 1130 may support communications in the dedicated radio frequency spectrum band or the shared radio frequency spectrum band. The UE transceiver(s) 1130 may be configured to communicate bi-directionally, via the UE antenna(s) 1140, with one or more of the base station 105 described with reference to FIG. 1, the base station 205 described with reference to FIG. 2, the base station 505 described with reference to FIG. 5 or the base station 1005 described with reference to FIG. 10, or aspects of one or more of the apparatus 605 described with reference to FIG. 6 or the apparatus 705 described with reference to FIG. 7. While the UE 1115 may include a single UE antenna, there may be examples in which the UE 1115 may include multiple UE antennas 1140.

The UE wireless communication manager 1150 may be configured to perform or control some or all of the UE or apparatus techniques or functions described with reference to FIG. 1, 2, 3, 4, 5, 8, or 9 related to wireless communication over the dedicated radio frequency spectrum band or the shared radio frequency spectrum band. For example, the UE wireless communication manager 1150 may be configured to receive configuration information on physical channel resources to monitor, and monitor the configured resources for frame format information using the dedicated radio frequency spectrum band or the shared radio frequency spectrum band. The UE wireless communication manager 1150 may include a UE LTE/LTE-A component for dedicated RF spectrum band 1155 configured to handle LTE/LTE-A communications in the dedicated radio frequency spectrum band, and a UE LTE/LTE-A component for shared RF spectrum band 1160 configured to handle LTE/LTE-A communications in the shared radio frequency spectrum band. The UE wireless communication manager 1150, or portions of it, may include a processor, or some or all of the functions of the UE wireless communication manager 1150 may be performed by the UE processor 1110 or in connection with the UE processor 1110. In some examples, the UE wireless communication manager 1150 may be an example of the wireless communication manager 820 described with reference to FIG. 8 or the wireless communication manager 920 described with reference to FIG. 9.

Figure 12:
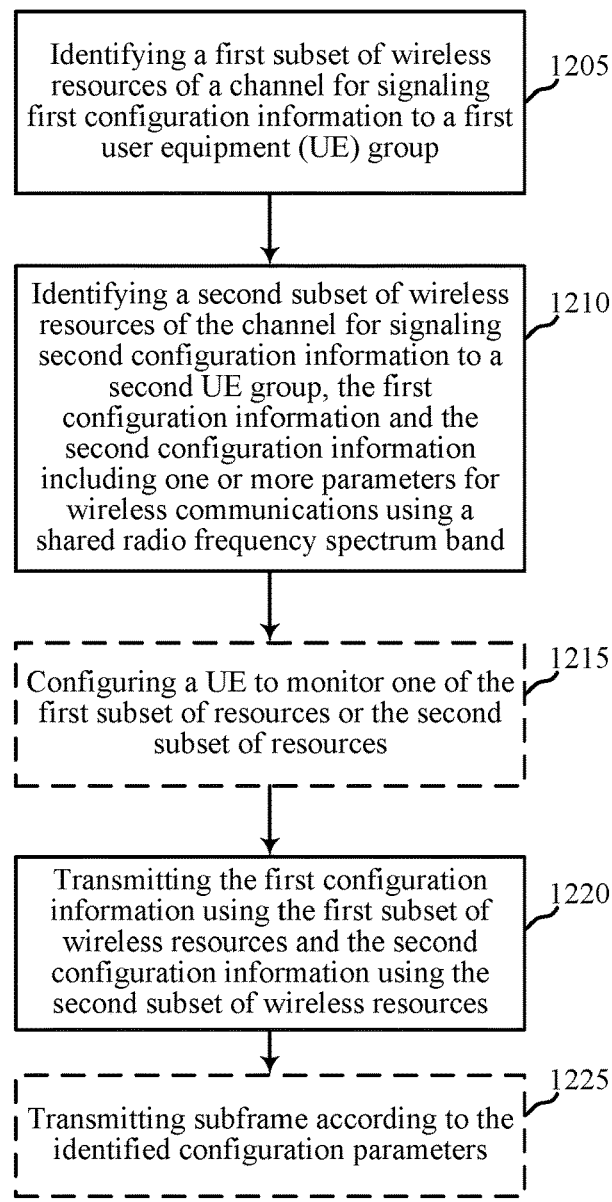
FIG. 12 is a flow chart illustrating an example of a method for wireless communication, in accordance with various aspects of the present disclosure.

FIG. 12 is a flow chart illustrating an example of a method 1200 for wireless communication, in accordance with various aspects of the present disclosure. For clarity, the method 1200 is described below with reference to aspects of one or more of the base station 105 described with reference to FIG. 1, the base station 205 described with reference to FIG. 2, the base station 505 described with reference to FIG. 5 or the base station 1005 described with reference to FIG. 10, or aspects of one or more of the apparatus 605 described with reference to FIG. 6 or the apparatus 705 described with reference to FIG. 7. In some examples, a wireless device (which in some examples may include aspects of a base station or an apparatus described with reference to FIG. 1, 2, 5, 6, 7, or 10) may execute one or more sets of codes to control the functional elements of the wireless device to perform the functions described below. Additionally or alternatively, the wireless device may perform one or more of the functions described below using special-purpose hardware.

At block 1205, the method 1200 may include identifying a first subset of wireless resources of a channel for signaling first configuration information to a first user equipment (UE) group. The operation(s) at block 1205 may be performed using the wireless communication manager 620 described with reference to FIG. 6, the wireless communication manager 720 described with reference to FIG. 7, the base station wireless communication manager 1060, described with reference to FIG. 10, or the wireless resource mapper 635 described with reference to FIG. 6 or the wireless resource mapper 735 described with reference to FIG. 7.

At block 1210, the method 1200 may include identifying a second subset of wireless resources of the channel for signaling second configuration information to a second UE group, the first configuration information and the second configuration information including one or more parameters for wireless communications using a shared radio frequency spectrum band. The operation(s) at block 1210 may be performed using the wireless communication manager 620 described with reference to FIG. 6, the wireless communication manager 720 described with reference to FIG. 7, the base station wireless communication manager 1060, described with reference to FIG. 10, or the wireless resource mapper 635 described with reference to FIG. 6 or the wireless resource mapper 735 described with reference to FIG. 7.

At block 1215, the method 1200 may optionally include configuring a UE to monitor one of the first subset of resources or the second subset of resources. The operation(s) at block 1215 may be performed using the wireless communication manager 620 described with reference to FIG. 6, the wireless communication manager 720 described with reference to FIG. 7, the base station wireless communication manager 1060, described with reference to FIG. 10, or the RRC manager 950 described with reference to FIG. 9.

At block 1220, the method 1200 may include transmitting the first configuration information using the first subset of wireless resources and the second configuration information using the second subset of wireless resources. The operation(s) at block 1220 may be performed using the wireless communication manager 620 described with reference to FIG. 6 or the wireless communication manager 720 described with reference to FIG. 7, or the base station wireless communication manager 1060, described with reference to FIG. 6, 7, or 10, or wireless resource mapper 635 described with reference to FIG. 6 or the wireless resource mapper 735 described with reference to FIG. 7.

At block 1225, the method 1200 may optionally include transmitting a subframe according to the identified configuration parameters. The operation(s) at block 1225 may be performed using the wireless communication manager 620 described with reference to FIG. 6, the wireless communication manager 720 described with reference to FIG. 7, the base station wireless communication manager 1060 described with reference to FIG. 10, the transmitter 630 described with reference to FIG. 6, the transmitter 730 described with reference to FIG. 7, or the base station transceiver(s) 1050 and base station antenna(s) 1055, described with reference to FIG. 10.

Thus, the method 1200 may provide for wireless communication. It should be noted that the method 1200 is just one implementation and that the operations of the method 1200 may be rearranged or otherwise modified such that other implementations are possible.

Figure 13:
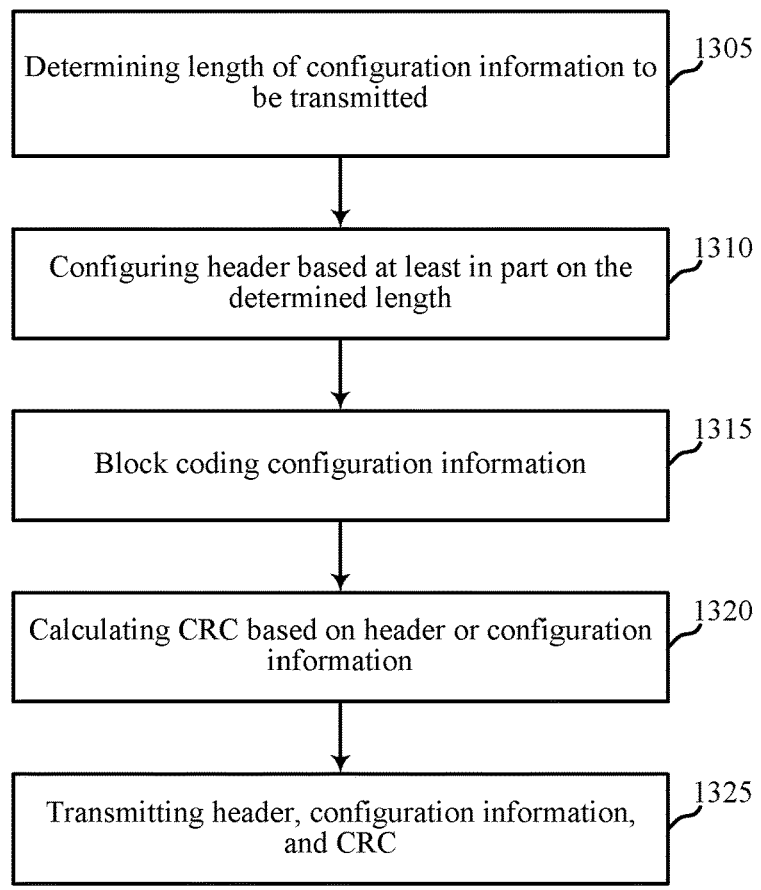
FIG. 13 is a flow chart illustrating an example of a method for wireless communication, in accordance with various aspects of the present disclosure.

FIG. 13 is a flow chart illustrating an example of a method 1300 for wireless communication, in accordance with various aspects of the present disclosure. For clarity, the method 1300 is described below with reference to aspects of one or more of the base station 105 described with reference to FIG. 1, the base station 205 described with reference to FIG. 2, the base station 505 described with reference to FIG. 5 or the base station 1005 described with reference to FIG. 10, or aspects of one or more of the apparatus 605 described with reference to FIG. 6 or the apparatus 705 described with reference to FIG. 7. In some examples, a wireless device (which in some examples may include aspects of a base station, or an apparatus described with reference to FIG. 1, 2, 5, 6, 7, or 10) may execute one or more sets of codes to control the functional elements of the wireless device to perform the functions described below. Additionally or alternatively, the wireless device may perform one or more of the functions described below using special-purpose hardware.

At block 1305, the method 1300 may include determining a length of configuration information to be transmitted. The configuration information may include frame format parameters as described above, for example, and the length of the configuration information may be determined based on the particular parameters to be transmitted. The operation(s) at block 1305 may be performed using the wireless communication manager 620 described with reference to FIG. 6, the wireless communication manager 720 described with reference to FIG. 7, the base station wireless communication manager 1060, described with reference to FIG. 10, or the header/CRC manager 770 described with reference to FIG. 7.

At block 1310, the method 1300 may include configuring a header based at least in part on the determined length. In some examples, the header may be a two-bit header and may be configured to have a value based on four available lengths of the configuration information. The operation(s) at block 1310 may be performed using the wireless communication manager 620 described with reference to FIG. 6, the wireless communication manager 720 described with reference to FIG. 7, the base station wireless communication manager 1060, described with reference to FIG. 10, or the header/CRC manager 770 described with reference to FIG. 7.

At block 1315, the method 1300 may include block coding of the configuration information. Such block coding may be performed using Reed Muller coding, for example. The operation(s) at block 1315 may be performed using the wireless communication manager 620 described with reference to FIG. 6, the wireless communication manager 720 described with reference to FIG. 7, the base station wireless communication manager 1060, described with reference to FIG. 10, or the block coding manager 765 described with reference to FIG. 7.

At block 1320, the method 1300 may include calculating a CRC based on header or configuration information. Such a CRC calculation may include, for example, calculating a four-bit CRC that may be used in increase reliability of the signaling of the frame format parameters. The operation(s) at block 1320 may be performed using the wireless communication manager 620 described with reference to FIG. 6, the wireless communication manager 720 described with reference to FIG. 7, the base station wireless communication manager 1060, described with reference to FIG. 10, or the header/CRC manager 770 described with reference to FIG. 7.

At block 1325 or 1330, the method 1300 may include transmitting header, configuration information, and CRC. The operation(s) at block 1325 may be performed using the wireless communication manager 620 described with reference to FIG. 6, the wireless communication manager 720 described with reference to FIG. 7, the base station wireless communication manager 1060, described with reference to FIG. 10, the transmitter 630 described with reference to FIG. 6, the transmitter 730 described with reference to FIG. 7, or the base station transceiver(s) 1050 and base station antenna (s) 1055, described with reference to FIG. 10.

Thus, the method 1300 may provide for wireless communication. It should be noted that the method 1300 is just one implementation and that the operations of the method 1300 may be rearranged or otherwise modified such that other implementations are possible.

Figure 14:
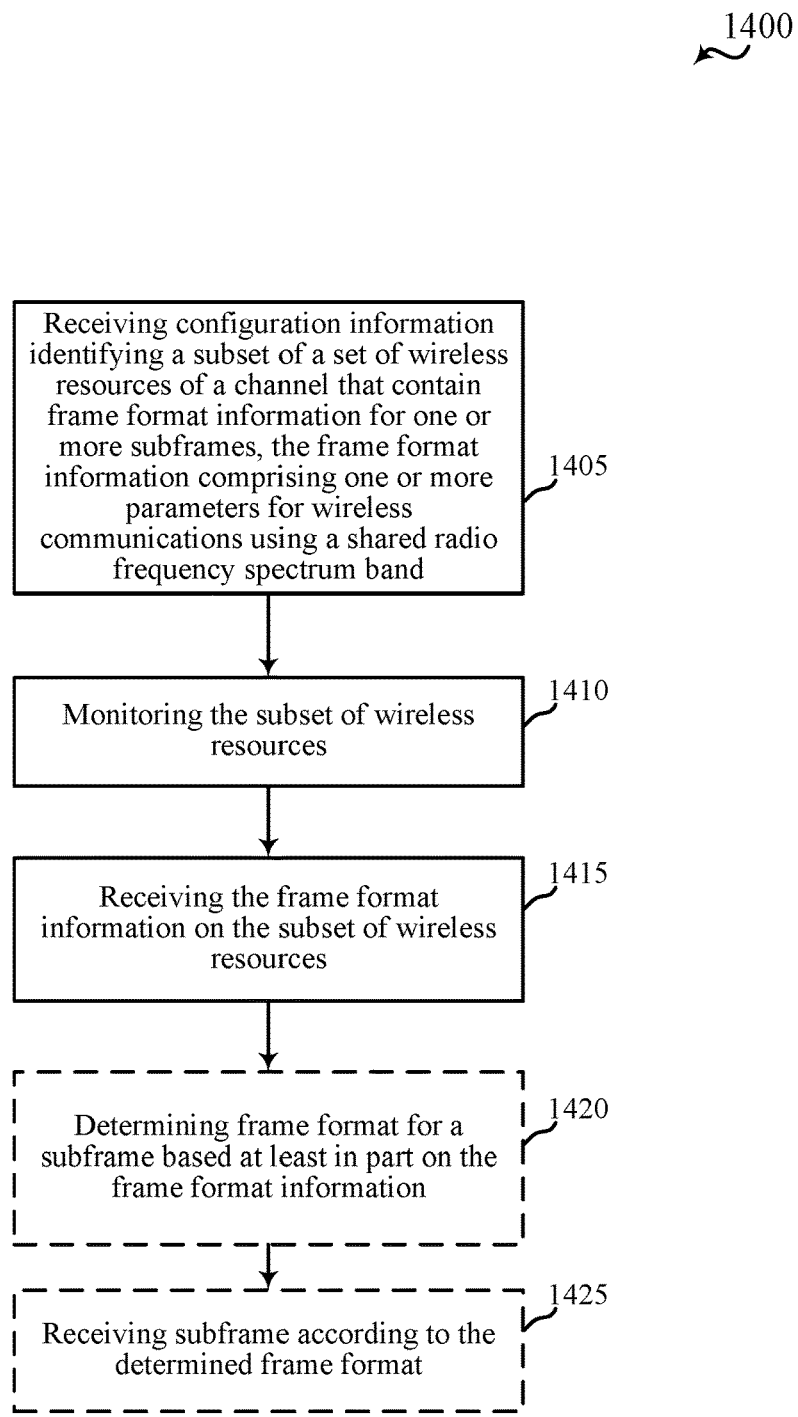
FIG. 14 is a flow chart illustrating an example of a method for wireless communication, in accordance with various aspects of the present disclosure.

FIG. 14 is a flow chart illustrating an example of a method 1400 for wireless communication, in accordance with various aspects of the present disclosure. For clarity, the method 1300 is described below with reference to aspects of one or more of the UE 115 described with reference to FIG. 1, the UE 215 described with reference to FIG. 2, the UE 515 described with reference to FIG. 5 or the UE 1115 described with reference to FIG. 11, or aspects of one or more of the apparatus 815 described with reference to FIG. 8 or the apparatus 915 described with reference to FIG. 9. In some examples, a wireless device (which in some examples may include aspects of a UE, or an apparatus described with reference to FIG. 1, 2, 5, 8, 9, or 11) may execute one or more sets of codes to control the functional elements of the wireless device to perform the functions described below. Additionally or alternatively, the wireless device may perform one or more of the functions described below using special-purpose hardware.

At block 1405, the method 1400 may include receiving configuration information identifying a subset of a set of wireless resources of a channel that contain frame format information for one or more subframes, the frame format information comprising one or more parameters for wireless communications using a shared radio frequency spectrum band. The operation(s) at block 1405 may be performed using the wireless communication manager 820 described with reference to FIG. 8 or the wireless communication manager 920 described with reference to FIG. 9, the UE wireless communication manager 1150 described with reference to FIG. 11, the configuration manager 835 described with reference to FIG. 8 or the configuration manager 935 described with reference to FIG. 9.

At block 1410, the method 1400 may include monitoring the subset of wireless resources. The operation(s) at block 1410 may be performed using the wireless communication manager 820 described with reference to FIG. 8 or the wireless communication manager 920 described with reference to FIG. 9, the UE wireless communication manager 1150 described with reference to FIG. 11, the channel monitor 840 described with reference to FIG. 8 or the channel monitor 940 described with reference to FIG. 9.

At block 1415, the method 1400 may include receiving the frame format information on the subset of wireless resources. The operation(s) at block 1415 may be performed using the wireless communication manager 820 described with reference to FIG. 8 or the wireless communication manager 920 described with reference to FIG. 9, the UE wireless communication manager 1150 described with reference to FIG. 11, the frame format manager 845 described with reference to FIG. 8 or the frame format manager 945 described with reference to FIG. 9.

At block 1420, the method 1400 may optionally include determining a frame format for a subframe based at least in part on the frame format information. The operation(s) at block 1420 may be performed using the wireless communication manager 820 described with reference to FIG. 8 or the wireless communication manager 920 described with reference to FIG. 9, the UE wireless communication manager 1150 described with reference to FIG. 11, the frame format manager 845 described with reference to FIG. 8 or the frame format manager 945 described with reference to FIG. 9.

At block 1425, the method 1400 may optionally include receiving subframe according to the determined frame format. The operation(s) at block 1425 may be performed using the wireless communication manager 820 described with reference to FIG. 8 or the wireless communication manager 920 described with reference to FIG. 9, the UE wireless communication manager 1150 described with reference to FIG. 11, the frame format manager 845 described with reference to FIG. 8 or the frame format manager 945 described with reference to FIG. 9, optionally the header/CRC manager 965 described with reference to FIG. 9, the receiver 810 described with reference to FIG. 8 or the receiver 910 described with reference to FIG. 9, or the UE transceiver(s) 1130 and UE antenna(s) 1140 described with reference to FIG. 11.

Thus, the method 1400 may provide for wireless communication. It should be noted that the method 1400 is just one implementation and that the operations of the method 1400 may be rearranged or otherwise modified such that other implementations are possible.

In some examples, aspects of the method 1200 described with reference to FIG. 12, the method 1300 described with reference to FIG. 13, or the method 1400 described with reference to FIG. 14 may be combined.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Non-transitory computer-readable media includes both computer storage media and communication media including any medium that facilitates transfer of a computer program from one place to another. A storage medium may be any available medium that can be accessed by a general purpose or special purpose computer. By way of example, and not limitation, non-transitory computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a non-transitory computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of non-transitory computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication at a base station, comprising:
    identifying a first subset of wireless resources of a channel on a contention-based shared radio frequency spectrum band, for signaling first configuration information to a first user equipment (UE) group;
    identifying a second subset of wireless resources of the channel on the contention-based shared radio frequency spectrum band, for signaling second configuration information to a second UE group, the first configuration information including one or more parameters for the first UE group and the second configuration information including one or more parameters for the second UE group to perform wireless communications using the contention-based shared radio frequency spectrum band; and
    transmitting the first configuration information to the first UE group using the first subset of wireless resources and the second configuration information to the second UE group using the second subset of wireless resources.

2. The method of claim 1, wherein the channel comprises a physical hybrid automatic repeat request (HARQ) indicator channel (PHICH), a physical control format indicator channel (PCFICH), a physical downlink control channel (PDCCH), or combinations thereof.

3. The method of claim 2, wherein the first configuration information is signaled using the PHICH and the second configuration information is signaled using one or more of the PCFICH or the PDCCH.

4. The method of claim 1, further comprising:
    configuring a UE to monitor one of the first subset of wireless resources or the second subset of wireless resources.

5. The method of claim 4, wherein configuring the UE further comprises:
    transmitting radio resource control (RRC) information to the UE indicating which of the first subset of wireless resources or the second subset of wireless resources the UE is to monitor.

6. The method of claim 1, wherein the first configuration information comprises a set of frame format parameters and the second configuration information comprises at least one overlapping parameter with the set of frame format parameters that has a different parameter value.

7. The method of claim 6, wherein the set of frame format parameters comprises one or more of a multimedia broadcast single frequency network (MBSFN) subframe type parameter, a partial subframe information parameter, a downlink/uplink configuration parameter, a downlink transmission burst length parameter, a time duration for uplink transmissions parameter, a time duration for which a UE stops monitoring downlink transmissions parameter, a reference signal power variation parameter, an aperiodic CSI-RS presence parameter or a discovery reference signal (DRS) presence indication and configuration, a system information presence parameter, or a do not monitor subframe parameter.

8. The method of claim 1, wherein the first configuration information comprises a first subset of a set of frame format parameters to be used by UEs of the first UE group, and wherein the second configuration information comprises a second subset of the set of frame format parameters to be used by UEs of the second UE group.

9. The method of claim 8, wherein a mapping of the first subset of the set of frame format parameters and the second subset of the set of frame format parameters is provided to the first UE group and the second UE group via radio resource control (RRC) signaling.

10. The method of claim 1, wherein the transmitting further comprises:
    block coding the first configuration information and the second configuration information.

11. The method of claim 1, wherein the transmitting further comprises:
    calculating a first cyclic redundancy check (CRC) for the first configuration information and a second CRC for the second configuration information; and
    appending the first CRC to the first configuration information and the second CRC to the second configuration information.

12. The method of claim 11, wherein the transmitting further comprises:
    scrambling the first CRC with a first radio network temporary identifier (RNTI) that is assigned to the first UE group and scrambling the second CRC with a second RNTI that is assigned to the second UE group.

13. The method of claim 1, wherein the first configuration information comprises information for a current subframe and at least one subsequent subframe.

14. The method of claim 1, wherein the first configuration information further comprises a header that indicates a size of the first configuration information.

15. The method of claim 1, wherein the first configuration information further comprises power variation information to indicate a power variation between two or more subframes.

16. A method for wireless communication at a user equipment, comprising:
    receiving configuration information, identified by a subset of a set of wireless resources of a channel on a contention-based shared radio frequency spectrum band, that contains frame format information for one or more subframes, the frame format information comprising one or more parameters for wireless communications using the contention-based shared radio frequency spectrum band;
    monitoring the subset of the set of wireless resources; and
    receiving, from a base station, the frame format information identified by the subset of the set of wireless resources.

17. The method of claim 16, wherein the channel comprises a physical hybrid automatic repeat request (HARQ) indicator channel (PHICH), a physical control format indicator channel (PCFICH), a physical downlink control channel (PDCCH), or combinations thereof.

18. The method of claim 17, wherein a first portion of the frame format information is received on the PHICH and a second portion of the frame format information is received on the PCFICH or the PDCCH.

19. The method of claim 16, wherein the configuration information is received via radio resource control (RRC) signaling from the base station.

20. The method of claim 16, wherein the frame format information comprises one or more of a multimedia broadcast single frequency network (MBSFN) subframe type parameter, a partial subframe information parameter, a downlink/uplink configuration parameter, a downlink transmission burst length parameter, a time duration for uplink transmissions parameter, a time duration for which a UE stops monitoring downlink transmissions parameter, a reference signal power variation parameter, an aperiodic CSI-RS presence parameter or a discovery reference signal (DRS) presence indication and configuration, a system information presence parameter, or a do not monitor subframe parameter.

21. An apparatus for wireless communication at a base station, comprising:
a processor;
memory in electronic communication with the processor; and
the processor and the memory configured to: identify a first subset of wireless resources of a channel on a contention-based shared radio frequency spectrum for signaling first configuration information to a first user equipment (UE) group;
identify a second subset of wireless resources of the channel on the contention-based shared radio frequency spectrum band, for signaling second configuration information to a second UE group, the first configuration information including one or more parameters for the first UE group and the second configuration information including one or more parameters for the second UE group to perform wireless communications using the contention-based shared radio frequency spectrum band; and
transmit the first configuration information to the first UE group using the first subset of wireless resources and the second configuration information to the second UE group using the second subset of wireless resources.

22. The apparatus of claim 21, wherein the channel comprises a physical hybrid automatic repeat request (HARQ) indicator channel (PHICH), a physical control format indicator channel (PCFICH), a physical downlink control channel (PDCCH), or combinations thereof.

23. The apparatus of claim 22, wherein the first configuration information is signaled using the PHICH and the second configuration information is signaled using one or more of the PCFICH or the PDCCH.

24. The apparatus of claim 21, wherein the processor and the memory are further configured to:
configure a UE to monitor one of the first subset of wireless resources or the second subset of wireless resources.

25. The apparatus of claim 24, where the processor and the memory are further configured to:
transmit radio resource control (RRC) information to the UE indicating which of the first subset of wireless resources or the second subset of wireless resources the UE is to monitor.

26. The apparatus of claim 21, wherein the first configuration information comprises a set of frame format parameters and the second configuration information comprises at least one overlapping parameter with the set of frame format parameters that has a different parameter value.

27. An apparatus for wireless communication at a user equipment, comprising:
a processor;
memory in electronic communication with the processor; and
the processor and memory configured to:
receive configuration information identified by a subset of a set of wireless resources of a channel on a contention-based shared radio frequency spectrum band, that contains frame format information for one or more subframes, the frame format information comprising one or more parameters for wireless communications using the contention-based shared radio frequency spectrum band;
monitor the subset of the set of wireless resources; and
receive, from a base station, the frame format information identified by the subset of the set of wireless resources.

28. The apparatus of claim 27, wherein the channel comprises a physical hybrid automatic repeat request (HARQ) indicator channel (PHICH), a physical control format indicator channel (PCFICH), a physical downlink control channel (PDCCH), or combinations thereof.

29. The apparatus of claim 28, wherein a first portion of the frame format information is received on the PHICH and a second portion of the frame format information is received on the PCFICH or the PDCCH.

30. The apparatus of claim 27, wherein the configuration information is received via radio resource control (RRC) signaling from the base station.

* * * * *